United States Patent [19]

Endoh

[11] Patent Number: 4,553,131
[45] Date of Patent: Nov. 12, 1985

[54] METHOD AND APPARATUS FOR ENCODING A BINARY DATA STREAM INTO A BINARY CODE STREAM

[75] Inventor: Naoki Endoh, Yokohama, Japan

[73] Assignee: Tokyo Shibaura Denki Kabushiki Kaisha, Kawasaki, Japan

[21] Appl. No.: 594,869

[22] Filed: Mar. 29, 1984

[30] Foreign Application Priority Data

Mar. 31, 1983 [JP] Japan .................................. 58-53539

[51] Int. Cl.$^4$ ........................................... H03K 13/24
[52] U.S. Cl. .............................. 340/347 DD; 360/40; 360/44
[58] Field of Search ............. 340/347 DD; 360/40-48

[56] References Cited

U.S. PATENT DOCUMENTS 4,357,634 11/1982 Chung ..................................... 360/40
4,496,934 1/1985 Furukawa .................... 340/347 DD

OTHER PUBLICATIONS

IEEE Transactions on Magnetics, vol. MAG-13, No. 5, "A New Look-Ahead Code for Increased Data Density"; G. V. Jacoby: 9/77.

J. Audio Eng. Soc., vol. 31, No. 4, "Channel Codings for Digital Audio Recordings"; T. T. Doi; Apr. 1983.

Primary Examiner—William M. Shoop, Jr.
Assistant Examiner—Saul M. Bergmann
Attorney, Agent, or Firm—Oblon, Fisher, Spivak, McClelland & Maier

[57] ABSTRACT

In an encode method in which a binary data stream is divided into data words each of three bits. Each of the data words is encoded into a binary code word of 9 bits. In the method, a code word to be encoded is encoded in consideration of a code word preceding the code word and two code words succeeding the code word. Then, one of the first two code bits in each code word and two of the last five code bits in the preceeding code word are inverted according to a pattern of code bits "0" and "1" in both the code words. As a result, consecutive 5 to 19 code bits "0" are arrayed between two adjacent code bits "1" in the code word stream.

10 Claims, 6 Drawing Figures

METHOD AND APPARATUS FOR ENCODING A BINARY DATA STREAM INTO A BINARY CODE STREAM

BACKGROUND OF THE INVENTION

The present invention relates to a method and apparatus for encoding a binary data stream into a binary code stream suitable for magnetic recording.

With recent advanced technology of A/D and D/A conversion, and analog signal such as an audio signal is digitally recorded in a magnetic tape or a magnetic disc. For recording a binary data stream consisting of a train of binary data "0" and "1" formed by the A/D conversion of an audio signal, as in the case of the analog recording, it is digital-modulated or encoded into a binary code stream suitable for mangetic recording. In the magnetic recording, the magnetizing polarity is inverted according to the binary code "0" and "1". MFM, 3PM and 4-12 conversion are enumerated for the conventional encoding methods. In this digital recording, a high density recording is desired, as a matter of course. To realize the high density recording, however, the following conditions are required. The first condition is that a minimum distance between transitions of magnetization Tmin is satisfactorily large. The second condition is that a maximum distance between transitions Tmax is satisfactorily small. The third condition is that a window margin Tw is large. When the minimum distance Tmin is small, a waveform interference is nonnegligible in the playback signal, resulting in increase of detection errors in the recording code. For effecting a high density recording, it is necessary to extract a clock signal for the demodulation (decoding) from the signal. If the minimum distance Tmin is fixed, as the maximum distance Tmax is larger, the number of the magnetizing polarity inversions input to a clock signal extracting system is smaller. The result is increase of a jitter of the clock signal. Therefore, if the maximum distance Tmax is large, the detection errors of the recording code increases. A window margin Tw means a time taken for sensing one bit of the recording code. In the high density recording, because of the presence of the waveform interference, noise etc., fluctuations in the phase of the reproduced waveform tends to be large. Therefore, when the window margin Tw is small, the detection error also tends to occur.

The above three conventional encoding methods are tabulated with respect to the above three conditions, as shown in Table 1.

TABLE 1

| Coding method | Tmin | Tmax | Tw |
| --- | --- | --- | --- |
| MFM | Tb | 2 Tb | 0.5 Tb |
| 3PM | 1.5 Tb | 6 Tb | 0.5 Tb |
| 4-12 conv. | 2 Tb | 8.33 Tb | 0.33 Tb |

In the above table, Tb is a duration of one bit of the original data.

As seen from Table 1, none of the methods perfectly fullfills the above three conditions. When comparing with the MFM earliest developed, the 3PM is improved 1.5 times in the minimum distance Tmin, but is inferior 3 times in the maximum distance Tmax. In the 4-12 conversion, the minimum distance Tmin is doubled, but the maximum distance Tmax is inferior four times or more. As for the window margin Tw, it is preferable that it is large. However, an insufficiency of the window margin Tw could be compensated to some degree by reducing a variation of a speed of the recording medium in a playback mode to a minimum and by improving the accuracy of the clock extracting system. Consequently, it is safe to say that the 4-12 conversion method is most suitable for the high density recording, except the condition of the maximum distance Tmax.

SUMMARY OF THE INVENTION

Accordingly, an object of the present invention is to provide a method for encoding a binary data stream into a binary code stream, which is more suitable for the high density recording than the conventional ones, and an encode apparatus for realizing the same.

To achieve the above object, there is provided a method for encoding a binary data stream into a binary code stream comprising the following steps of:

dividing a binary data stream into data codes each of 3 bits;

determining which groups, each data word belongs to first, second or third group;

encoding unconditionally a data word into a binary code word of 9 bits when the data word belongs to the first group, encoding a data word into a binary code word of 9 bits in consideration of preceding or succeeding two data words when the data word belongs to the second group, encoding a data word into a binary code word of 9 bits in consideration of a preceding data word and a succeeding data word when the data word belongs to the third group;

inverting the bit codes at predetermined bit locations in each code word and one preceding code word according to a pattern of code bits "0" and "1" in both said code words to merge said code words so that in the code word stream consecutive 5 to 19codes "0" are arrayed between two adjacent codes "1"; and converting each of said code words into a binary code stream.

The above encode method can provide a binary code stream having: Tmin=2Tb, Tmax=6.67Tb and Tw=0.33Tb (Tb is a clock period of the data).

DETAILED DESCRIPTION OF THE PREFERRED EMBODIMENTS

Figure 1:
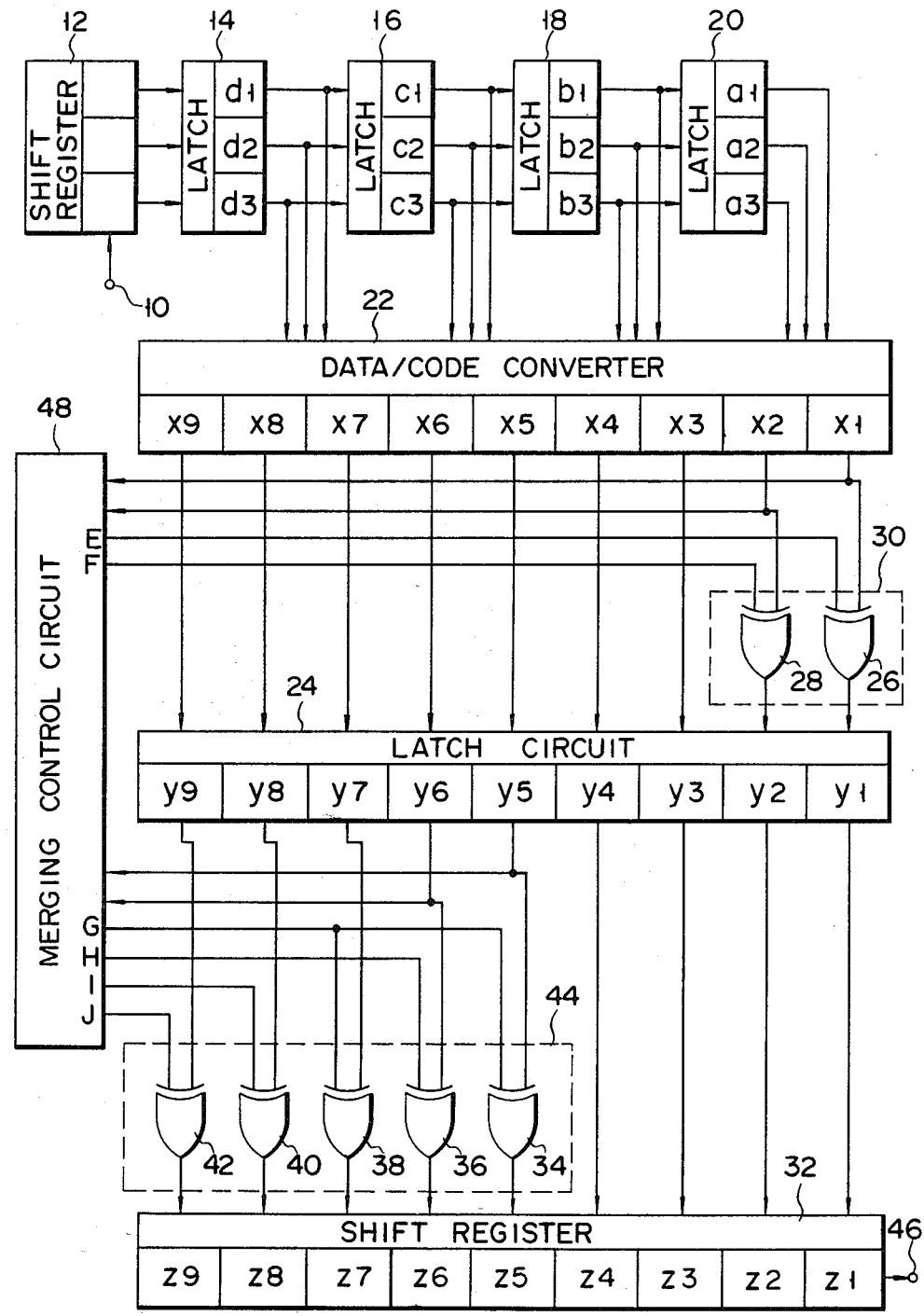
FIG. 1 is a block diagram illustrating an embodiment of an encode apparatus realizing an encode method according to the present invention.

Preferred embodiments of the present invention will be described in detail referring to the accompanying drawings. In an encode method, a binary data stream is divided every m bits. Each divided data stream of m bits is treated as one data word. The data word of m bits is encoded into a code word consisting a binary code stream on n bits. In this case, Tmin, Tmax and Tw are given:

$$Tmin = (m/n)(d+1)Tb \qquad (1)$$

$$Tmax = (m/n)(k+1)Tb \qquad (2)$$

$$Tw = (m/n)Tb \qquad (3)$$

where d and k, respectively, are minimum and maximum numbers of consecutive codes "0" located between two adjacent codes "1" in the code stream.

In the present invention, the number m of bits in the data word is 3, and the number n of bits in the code word is 9. For the encoding parameter, it is first required that the minimum distance Tmin is 2Tb as the maximum value of the conventional encoding method. To satisfy this requirement, the equation (1) indicates that the condition d=5 must be satisfied. In other words, in a code stream obtained, at least five consecutive codes "0" must be arrayed.

In the present embodiment, data words each of 3 bits b1, b2, b3 are respectively encoded into code words each of 9 bits x1 to x9, as tabulated below.

TABLE 2

|   | Data word B | | | Code word X | | | | | | | | |
|---|---|---|---|---|---|---|---|---|---|---|---|---|
|   | b1 | b2 | b3 | x1 | x2 | x3 | x4 | x5 | x6 | x7 | x8 | x9 |
| A | 0 | 0 | 0 | 1 | 0 | 0 | 0 | 0 | 0 | 0 | 0 | 0 |
|   | 0 | 0 | 1 | 0 | 1 | 0 | 0 | 0 | 0 | 0 | 0 | 0 |
|   | 0 | 1 | 0 | 0 | 0 | 1 | 0 | 0 | 0 | 0 | 0 | 0 |
|   | 0 | 1 | 1 | 0 | 0 | 0 | 1 | 0 | 0 | 0 | 0 | 0 |
|   | 1 | 0 | 0 | 0 | 0 | 0 | 0 | 1 | 0 | 0 | 0 | 0 |
|   | 1 | 0 | 1 | 0 | 0 | 0 | 0 | 0 | 1 | 0 | 0 | 0 |
| B | 1 | 1 | 0 | 1 | 0 | 0 | 0 | 0 | 1 | 0 | 0 | 0 |
|   | 1 | 1 | 1 | 0 | 1 | 0 | 0 | 0 | 1 | 0 | 0 | 0 |

As shown, the last 4 bits x7, x8, x9 of all of the code words are all "0". Of 8 data words, the 6 data words are categorized into a group A, and the remaining two data words, into a group B. The code words in the group A each consist of one code bit "1" and eight code bits "0". The code words in the group B each consist of two "1's" and seven "0's". In the code words of the group B, three or four consecutive "0's" are arrayed between the adjacent "1's". Accordingly, the code words in the group B can not satisfy the condition d=5, unless those bits are appropriately modified. The reason why such a code is employed for the data words in the group B is that "0's" must be assigned to the last three bits of the code for indicating that a merging a effected. The merging means that if the condition d=5 is not satisfied in two consecutive code words, some bits in the code word are inverted or reversed. In the encoding in Table 2, the following three cases require the merging. The first case is a combination of a code word **01000 and a succeeding code word 10***. The second case is a combination of a code word 01000 and a succeeding code word 01***. The third case is a combination of a code word 10000 and a succeeding code word 10*****. In these three cases, if the merging as given in the following table is applied to one code word X and the preceding code word Y, the condition d=5 is satisfied in the two consecutive code words.

TABLE 3

|   | Code word Y | | | | | | | | | Code word X | | | | | | | | |
|---|---|---|---|---|---|---|---|---|---|---|---|---|---|---|---|---|---|---|
|   | y1 | y2 | y3 | y4 | y5 | y6 | y7 | y8 | y9 | x1 | x2 | x3 | x4 | x5 | x6 | x7 | x8 | x9 |
| 1 | * | * | * | * | 0 | 1↓ | 0 | 0 | 0↓ | 1↓ | 0 | * | * | * | * | * | * | * |
|   | * | * | * | * | 0 | 0 | 0 | 0 | 1 | 0 | 0 | * | * | * | * | * | * | * |
| 2 | * | * | * | * | 0 | 1↓ | 0 | 0 | 0↓ | 0 | 1↓ | * | * | * | * | * | * | * |
|   | * | * | * | * | 0 | 0 | 0 | 1 | 0 | 0 | 0 | * | * | * | * | * | * | * |
| 3 | * | * | * | * | 1↓ | 0 | 0 | 0 | 0 | 1↓ | 0 | * | * | * | * | * | * | * |
|   | * | * | * | * | 0 | 0 | 1 | 0 | 0 | 0 | 0 | * | * | * | * | * | * | * |

In the above codes, * indicates the bit which may be either of "0" or "1" and is free from the merging. In Table 3, in the merging (1), when the code bits x1 and y6 are "1", the code bits x1 and y6 are inverted to "0" and the code bit y9 to "1". In the merging (2), when the code bits x2 and y6 are "1", the code bits x2 and y6 are inverted to "0", and the code bit y8 to "1". In the merging (3), when the code bits X1 and y5 are "1", those bits are inverted to "0" and the code bit y7 to "1".

When the data word consists of only data words in the group A, the condition d=5 is satisfied if the data words are encoded according to Table 2 and subjected to the merging shown in Table 3. When the code words in the group B is contained in the code stream and the merging for the code words in the group B is not performed, the condition d=5 is not satisfied. Let us consider a data word to be decoded is denoted as B (b1, b2, b3), the preceding data word A (a1, a2, a3), and the succeeding data word C (c1, c2, c3). The case that the merging is not performed and the condition d=5 is not satisfied, is in the following. The first case is that the data word B is 110, the preceding data word A is any one of 000, 001, 010 and 011, and the succeeding data word C is any one of 010, 011, 100 and 101. No merging is performed for the code word 100001000 corresponding to the data word 110. The second case is that the data word B is 111, the preceding data word A is any one of 000, 001, 010, 011 and 100, and the succeeding data word C is any one of 010, 011, 100 and 101. No merging is performed for the code word 0100001000 corresponding to the data word 111. In such two consecutive two code words, the condition d=5 is not satisfied. As for the data words (110) and (111), a special encoding, which is different from the encoding shown in Table 2, is applied for those data words when a certain condition holds for the relationships of those data words to the preceding and the succeeding data words. In this way, the condition d=5 holds for every type of the data words. The above special encoding should be preferably realized by using only the code words other than those shown in Table 2. Actually, however, the situation does not allow such. Therefore, when the special encoding is performed on a data word, it is necessary to recognize the special encoding of the code word from the code word stream per se. Specifically, when the code word stream once magnetically recoded is reproduced, the code word stream reproduced must indicate as to whether or not the reproduced code word has specially been encoded. To realize this, it is insufficient that the special encoding is applied to only the data words (110) and (111). It is necessary to apply the special encoding to the data word preceding each of those data word. If the encoding containfing the special encoding is applied for each data word and then those data words are merged according to Table 3, the code word stream capable of satisfying d=5 can be obtained. In a playback mode, by checking the several code words of the code word stream the code word can be decoded into the correct data word. The encoding method is tabulated in Table 4 for each condition.

preceding the data word B, and data words C and D succeeding the data word B.

(iii) The merging shown in Table 3 is performed according to each code word X as the result of encoding, and the code word Y preceding the code word X.

Since the code word stream thus obtained satisfies the condition d=5, then Tmin=2Tb, viz. the first condition for high density recording is satisfied. Tw is led from the equation (3), and $(\frac{1}{3})Tb \approx 0.33Tb$. This value is a tolerable value. A simulation showed that a maximum number k of the successive "0's" in the code stream is 19, i.e. k=19, and $Tmax=(20/3)Tb \approx 6.67Tb$. This data indicates that for effecting the high density recording, the encoding of the present invention is superior to the

TABLE 4

|   |      | Data word B | Code word X   | Condition                             |
|---|------|-------------|---------------|---------------------------------------|
| 1 | I    | 0 0 0       | 1 0 0 0 0 0 1 0 0 | C = 110 and D = 010, 011, 100 or 101 |
|   |      |             | 1 0 0 0 0 0 1 0 0 | C = 111 and D = 010, 011, 100 or 101 |
|   |      |             | 1 0 0 0 0 0 0 0 0 | Other than the above                 |
|   | II   | 0 0 1       | 0 1 0 0 0 0 0 1 0 | C = 110 and D = 010, 011, 100 or 101 |
|   |      |             | 1 0 0 0 0 0 1 0 0 | C = 111 and D = 010                  |
|   |      |             | 0 1 0 0 0 0 0 0 1 | C = 111 and D = 011 or 100           |
|   |      |             | 0 1 0 0 0 0 0 0 0 | Other than the above                 |
|   | III  | 0 1 0       | 0 0 1 0 0 0 0 0 1 | C = 110 and D = 011 or 100           |
|   |      |             | 0 0 1 0 0 0 0 0 1 | C = 111 and D = 010, 011, 100 or 101 |
|   |      |             | 0 0 1 0 0 0 0 0 0 | Other than the above                 |
|   | IV   | 0 1 1       | 0 0 0 0 0 0 1 0 0 | C = 110 and D = 010, 011, 100 or 101 |
|   |      |             | 0 0 1 0 0 0 0 0 0 | Other than the above                 |
| 2 | V    | 1 0 0       | 0 0 0 0 1 0 0 0 0 | Uncondition                          |
|   | VI   | 1 0 1       | 0 0 0 0 0 1 0 0 0 | Uncondition                          |
| 3 | VII  | 1 1 0       | 0 0 0 0 0 1 0 0 0 | A = 000 and C = 010, 011, 100 or 101 |
|   |      |             | 0 0 0 0 1 0 0 0 0 | A = 001 and C = 010, 011, 100 or 101 |
| 3 | VII  |             | 0 0 0 0 0 0 1 0 0 | A = 010 and C = 011                  |
|   |      |             | 0 0 0 0 0 0 0 1 0 | A = 010 and C = 100                  |
|   |      |             | 0 0 1 0 0 0 0 0 1 | A = 010 and C = 101                  |
|   |      |             | 0 0 0 0 0 0 0 0 0 | A = 010 and C = 010                  |
|   |      |             | 0 0 0 1 0 0 0 0 0 | A = 011 and C = 010, 011, 100 or 101 |
|   |      |             | 1 0 0 0 0 1 0 0 0 | Other than the above                 |
|   | VIII | 1 1 1       | 0 0 0 0 0 0 0 0 0 | A = 000 and C = 010, 011, 100 or 101 |
|   |      |             | 0 0 0 0 0 0 0 0 0 | A = 010 and C = 010, 011, 100 or 101 |
|   |      |             | 0 0 0 0 0 0 0 0 0 | A = 011 and C = 010                  |
|   |      |             | 0 0 0 0 1 0 0 0 0 | A = 001 and C = 010                  |
|   |      |             | 0 0 0 0 0 0 1 0 0 | A = 001 and C = 011                  |
|   |      |             | 0 0 0 0 0 0 0 1 0 | A = 001 or 100 and C = 100           |
|   |      |             | 0 0 1 0 0 0 0 0 1 | A = 001, 011 or 100 and C = 101      |
|   |      |             | 1 0 0 0 0 0 1 0 0 | A = 001 and C = 011                  |
|   |      |             | 1 0 0 0 0 0 0 1 0 | A = 011 and C = 100                  |
|   |      |             | 0 0 0 0 0 0 0 0 0 | A = 100 and C = 010 or 011           |
|   |      |             | 0 1 0 0 0 1 0 0 0 | Other than the above                 |

As apparent from Table 4, the encoding method according to this invention is grouped into three cases according to the data word. When the first case, i.e., the data word is 000, 001, 010 or 011 (group 1), the data word B is encoded in accordance with the succeeding two data words C, D. When the second case, i.e., the data word is 100 or 101 (group 2), the data word B is encoded unconditionally. When the third case, i.e., the data word is 110 or 111 (group 3), the data word B is encoded in accordance with the preceding data word A and the succeeding data word C. The third case is a case in which the special encoding is performed. The first case is a case in which the special encoding for the preceding data word is performed.

In summary, the encode method according to the present invention, which has thus far mentioned, has the following steps.

(i) The binary data stream is divided every 3 bits into data words.

(ii) The divided data word B is encoded into a code word X of 9 bits, as shown in Table 4, on the basis of the data word B to be encoded, a data word A conventional 4-12 conversion.

Actually, prior to the magnetic recording of the code word, a synchronous signal is added to the code word stream to secure a reliable decoding.

How the code word stream thus encoded and magnetically recorded is reproduced or decoded, will be given hereinafter. The code word stream reproduced from the recording medium is divided every 9 bits at the timing as given by the synchronous signal added to the code word stream, and the code word is extracted from the code word stream. The synchronous signal has a predetermined synchronous signal pattern and inserted into the code words for a predetermined number of code words. For reproducing the cord words, the synchronous signal pattern is detected and a synchronization for the code word stream is set up. Then, the code word stream is divided into code words each of 9 bits. Assume now that a code word consisting of 9 bits is R, a second code word preceding the code word R is P, a code word preceding the code word R is Q, a code word succeeding the code word R is S and a second code word succeeding the code word R is T. Assume further that the code word R is to be decoded. These code words P, Q, R, S and T are obtained through the encode processing as mentioned above, and of course correspond to the data words, respectively. Therefore, if one knows a code pattern of each code word, i.e. an array of "0's" and "1's", the decode of the code word is possible. As seen from the encoding tables in Tables 3 and 4, there is a case, in the digital modulation according to the present invention, that the same code word is assigned to the different data words. Therefore, in such case, even if the code pattern is known, it is impossible to identify the data word corresponding to the code word. This problem, however, can be solved in a manner that, in decoding the code word R, specific bits of the code words P, Q, S and T successive to the code word R are additionally checked and a code pattern of the specific bits is used for idenfiying the original data word. More specifically, 4 bits in the code word P, 6 bits in the code word Q, 6 bits in the code word S and 4 bits in the code word S are checked. Table 5 illustrates the correspondences between the code words and data words in such a digital modulation. In this table, bit representing no data has no relation with the demodulation. As shown, a total of 29 bits are used for the data word identifying processing; the bits (p5, p7 to p9) in the code word P, the bits (q1 to q3, q7 to q9) in the code word Q, all the bits (r1 to r9) in the code word R, the bits (s4 to s9) in the code word S and the bits (t4 to t7) in the code word T.

TABLE 5

| p5 | p7 | p8 | p9 | q1 | q2 | q3 | q7 | q8 | q9 | r1 | r2 | r3 | r4 | r5 | r6 | r7 | r8 | r9 | s4 | s5 | s6 | s7 | s8 | s9 | t4 | t5 | t6 | t7 | b1 | b2 | b3 |
|---|---|---|---|---|---|---|---|---|---|---|---|---|---|---|---|---|---|---|---|---|---|---|---|---|---|---|---|---|---|---|---|
|   |   |   |   | 0 | 0 |   |   |   |   | 1 |   |   |   | 1 |   |   |   |   |   |   |   |   |   |   |   |   |   |   | 1 | 1 | 0 |
|   |   |   |   | 1 | 0 |   |   |   |   | 1 |   |   |   | 1 |   |   |   |   |   |   |   |   |   |   |   |   |   |   | 0 | 1 | 1 |
|   |   |   |   | 1 | 0 |   |   |   |   | 1 |   |   |   | 1 |   |   |   |   |   |   |   |   |   |   |   |   |   |   | 0 | 1 | 1 |
|   |   |   |   | 0 | 1 |   |   |   |   | 1 |   |   |   | 1 |   |   |   |   |   |   |   |   |   |   |   |   |   |   | 0 | 1 | 1 |
|   |   |   |   |   |   |   |   |   |   | 1 |   |   |   |   | 1 |   |   |   |   |   |   |   |   |   |   |   |   |   | 1 | 1 | 1 |
|   |   |   |   |   |   |   |   |   |   | 1 |   |   |   |   |   | 1 |   |   |   |   |   |   |   |   |   |   |   |   | 1 | 1 | 0 |
|   |   |   |   | 0 | 1 |   |   |   |   | 1 |   |   |   |   |   |   | 1 |   |   |   |   |   |   |   |   |   |   |   | 0 | 1 | 1 |
|   |   |   |   | 1 | 0 |   |   |   |   | 1 |   |   |   |   |   |   | 1 |   |   |   |   |   |   |   |   |   |   |   | 0 | 1 | 1 |
|   |   |   |   | 0 | 0 |   |   |   |   | 1 |   |   |   |   |   |   | 1 |   |   | 1 | 0 |   |   |   |   |   |   |   | 0 | 0 | 1 |
|   |   |   |   | 0 | 0 |   |   |   |   | 1 |   |   |   |   |   |   | 1 |   |   | 0 | 1 |   |   |   |   |   |   |   | 0 | 0 | 0 |
|   |   |   |   | 0 | 0 |   |   |   |   | 1 |   |   |   |   |   |   | 1 |   |   | 0 | 0 |   |   |   |   |   |   |   | 0 | 0 | 0 |
|   |   |   |   |   |   |   |   |   |   | 1 |   |   |   |   |   |   |   | 1 |   |   |   |   |   |   |   |   |   |   | 1 | 1 | 0 |
|   |   |   |   |   |   |   |   |   |   | 1 |   |   |   |   |   |   |   |   | 1 |   |   |   |   |   |   |   |   |   | 1 | 1 | 0 |
|   | 0 |   |   | 0 | 0 |   |   |   |   | 1 |   |   | 0 | 0 | 0 | 0 | 0 | 0 |   |   |   |   |   |   |   |   |   |   | 0 | 0 | 0 |
|   | 1 |   |   |   |   |   |   |   |   | 1 |   |   | 0 | 0 | 0 | 0 | 0 | 0 |   |   |   |   |   |   |   |   |   |   | 1 | 1 | 1 |
|   |   |   |   |   |   | 1 |   |   |   | 1 |   |   | 0 | 0 | 0 | 0 | 0 | 0 |   |   |   |   |   |   |   |   |   |   | 1 | 1 | 1 |
|   |   |   |   |   |   |   | 1 |   |   | 1 |   |   | 0 | 0 | 0 | 0 | 0 | 0 |   |   |   |   |   |   |   |   |   |   | 1 | 1 | 1 |
|   |   | 1 |   |   |   |   |   |   |   |   |   |   | 1 |   |   |   |   |   |   |   |   |   |   |   |   |   |   |   | 1 | 1 | 0 |
|   |   |   |   |   |   |   |   | 1 |   |   |   |   | 1 |   |   |   |   |   |   |   |   |   |   |   |   |   |   |   | 1 | 1 | 0 |
|   |   |   |   |   |   |   |   |   | 1 |   |   |   | 1 |   |   |   |   |   |   |   |   |   |   |   |   |   |   |   | 1 | 0 | 0 |
|   |   |   |   |   |   |   |   | 1 |   |   |   |   | 1 |   |   |   |   |   |   |   |   |   |   |   |   |   |   |   | 1 | 0 | 0 |
| 1 |   |   |   |   |   |   | 0 |   |   |   |   |   | 1 |   |   |   |   |   |   |   |   |   |   |   |   |   |   |   | 1 | 0 | 0 |
|   |   |   |   |   |   |   |   |   |   | 1 |   |   |   |   |   | 1 |   |   |   |   |   |   |   |   |   |   |   |   | 1 | 1 | 1 |
|   |   |   |   |   |   |   |   |   |   | 1 |   |   |   |   |   |   | 1 |   |   |   |   |   |   |   |   |   |   |   | 1 | 0 | 0 |
|   |   |   |   |   |   |   |   |   |   | 1 |   |   |   |   |   |   |   | 1 |   | 0 |   |   |   |   |   |   |   |   | 1 | 1 | 1 |
|   |   |   |   |   |   |   |   |   |   | 1 |   |   |   |   |   |   |   | 1 |   | 1 |   |   |   |   |   |   |   |   | 0 | 0 | 1 |
|   |   |   |   |   |   |   |   |   |   | 1 |   |   |   |   |   |   |   |   | 1 |   | 0 | 0 |   |   |   |   |   |   | 1 | 1 | 1 |
|   |   |   |   |   |   |   |   |   |   | 1 |   |   |   |   |   |   |   |   | 1 |   | 1 | 0 |   |   | 0 | 0 | 0 | 0 | 1 | 1 | 1 |
|   |   |   |   |   |   |   |   |   |   | 1 |   |   |   |   |   |   |   |   | 1 |   | 1 | 0 |   |   |   |   |   | 1 | 1 | 1 | 1 |
|   |   |   |   |   |   |   |   |   |   | 1 |   |   |   |   |   |   |   |   | 1 |   | 1 | 0 |   | 1 |   |   |   |   | 1 | 1 | 1 |
|   |   |   |   |   |   |   |   |   |   | 1 |   |   |   |   |   |   |   |   | 1 |   | 1 | 0 | 1 |   |   |   |   |   | 0 | 0 | 1 |
|   |   |   |   |   |   |   |   |   |   | 1 |   |   |   |   |   |   |   |   | 1 |   | 1 | 0 |   |   |   |   |   | 1 | 0 | 0 | 1 |
|   |   |   |   |   |   |   |   |   |   | 1 |   |   |   |   |   |   |   |   | 1 |   | 0 | 1 |   | 1 |   |   |   |   | 0 | 0 | 1 |
|   |   |   |   |   |   |   |   |   |   | 1 |   |   |   |   |   |   |   |   | 1 |   | 0 | 1 |   |   |   |   |   | 1 | 0 | 0 | 1 |
|   |   |   |   |   |   |   |   |   |   | 1 |   |   |   |   |   |   |   |   | 1 |   | 0 | 1 |   | 0 |   |   |   | 0 | 1 | 1 | 1 |
|   |   |   |   |   |   |   |   |   |   | 1 |   |   | 0 | 0 | 0 | 0 | 0 |   |   |   |   |   |   |   |   |   |   |   | 0 | 0 | 1 |
|   |   |   |   |   |   |   | 1 |   |   |   | 1 |   |   | 1 |   |   |   |   |   |   |   |   |   |   |   |   |   |   | 1 | 0 | 1 |
|   |   |   |   |   |   |   | 0 |   |   |   | 1 |   |   | 1 |   |   |   |   |   |   |   |   |   |   |   |   |   |   | 1 | 1 | 0 |
|   |   |   |   |   |   |   | 0 |   |   |   | 1 |   |   |   |   | 1 |   |   | 0 | 0 | 0 |   |   |   |   |   |   |   | 0 | 0 | 0 |
|   |   |   |   |   |   |   | 0 |   |   |   | 1 |   |   |   |   | 1 |   |   |   |   |   | 1 |   |   |   |   |   |   | 0 | 0 | 1 |
|   |   |   |   |   |   |   | 0 |   |   |   | 1 |   |   |   |   | 1 |   |   |   | 1 |   |   |   |   |   |   |   |   | 1 | 1 | 1 |
|   |   |   |   |   |   |   | 0 |   |   |   | 1 |   |   |   |   | 1 |   |   | 1 |   |   |   | 1 |   |   |   |   |   | 1 | 1 | 1 |
|   |   |   |   |   |   |   | 1 |   |   |   | 1 |   |   |   |   | 1 |   |   |   |   |   |   | 1 |   |   |   |   |   | 1 | 1 | 0 |
|   |   |   |   |   |   |   | 1 |   |   |   | 1 |   |   |   |   | 1 |   |   |   |   |   | 1 |   |   |   |   |   |   | 1 | 1 | 0 |
|   |   |   |   |   |   |   | 1 |   |   |   | 1 |   |   |   |   |   | 1 |   | 0 | 0 |   |   |   |   |   |   |   |   | 1 | 0 | 1 |
|   |   |   |   |   |   |   | 1 |   |   |   | 1 |   |   |   |   |   | 1 |   |   | 1 |   |   |   |   |   |   |   |   | 1 | 1 | 0 |
|   |   |   |   |   |   |   | 1 |   |   |   | 1 |   |   |   |   |   | 1 |   |   |   | 1 |   |   |   |   |   |   |   | 1 | 1 | 0 |
|   |   |   |   |   |   |   | 0 |   |   |   | 1 |   |   |   |   |   | 1 |   |   | 1 |   |   | 1 |   |   |   |   |   | 1 | 1 | 0 |
|   |   |   |   |   |   |   | 0 |   |   |   | 1 |   |   |   |   |   | 1 |   |   |   | 1 |   |   | 1 |   |   |   |   | 1 | 1 | 1 |
|   |   |   |   |   |   |   | 0 |   |   |   | 1 |   |   |   |   |   |   | 1 |   | 0 | 0 |   |   |   |   |   |   |   | 1 | 1 | 1 |
|   |   |   |   |   |   |   | 1 |   |   |   | 1 |   |   |   |   |   |   | 1 |   |   |   |   |   |   |   |   |   |   | 1 | 0 | 1 |
|   |   |   |   |   |   |   | 0 |   |   |   | 1 |   |   |   |   |   |   |   | 1 |   |   |   |   |   |   |   |   |   | 1 | 1 | 0 |
|   |   |   |   |   |   |   | 1 |   |   |   | 1 |   |   |   | 0 | 0 | 0 | 0 |   |   |   |   |   |   |   |   |   |   | 1 | 1 | 1 |
|   |   |   |   |   |   |   | 0 |   |   |   | 1 |   |   |   | 0 | 0 | 0 | 0 |   |   |   |   |   |   |   |   |   |   | 0 | 0 | 0 |
|   |   |   |   |   |   |   |   |   |   |   |   | 1 |   |   |   | 1 |   |   | 0 | 0 | 0 | 0 |   |   |   |   |   |   | 0 | 0 | 0 |
|   |   |   |   |   |   |   |   |   |   |   |   | 1 |   |   |   | 1 |   |   |   |   |   | 1 |   |   |   |   |   |   | 0 | 0 | 0 |
|   |   |   |   |   |   |   |   |   |   |   |   | 1 |   |   |   |   | 1 |   |   |   |   | 1 |   |   |   |   |   |   | 0 | 0 | 0 |
|   |   |   |   |   |   |   |   |   |   |   |   | 1 |   |   |   |   |   |   |   |   |   |   |   | 1 |   |   |   |   | 0 | 0 | 1 |

TABLE 5-continued

| | | | | | | | | | | Code word | | | | | | | | | | | | | | | | | | | Data word | | |
|---|---|---|---|---|---|---|---|---|---|---|---|---|---|---|---|---|---|---|---|---|---|---|---|---|---|---|---|---|---|---|---|
| p5 | p7 | p8 | p9 | q1 | q2 | q3 | q7 | q8 | q9 | r1 | r2 | r3 | r4 | r5 | r6 | r7 | r8 | r9 | s4 | s5 | s6 | s7 | s8 | s9 | t4 | t5 | t6 | t7 | b1 | b2 | b3 |
| | | | | | | | | | | 1 | | | | | | | 1 | | 1 | | | | | | | | | | 1 | 1 | 1 |
| | | | | | | | | | | 1 | | | | | | | 1 | | | | 1 | | | | | | | | 1 | 1 | 1 |
| | | | | | | | | | | 1 | | | | 1 | | | | | | 1 | | | | | | | | | 1 | 1 | 1 |
| | | | | | | | | | | 1 | | | | | | | 1 | | | | | 1 | | | | | | | 1 | 1 | 1 |
| | | | | | | | | | | 1 | | | | | | | 1 | | 0 | 0 | | | | | | | | | 1 | 1 | 0 |
| | | | | | | | | | | 1 | | | | | | 1 | | | | | | | | | | | | | 1 | 1 | 0 |
| | | | | | | | | | | 1 | | | | | | 0 | 0 | | | 0 | | | | | | | | | 0 | 0 | 0 |
| | | | | | | | | | | | | 1 | | | | | 1 | | | | 1 | | | | | | | | 0 | 0 | 1 |
| | | | | | | | | | | | | 1 | | | | | 1 | | | 0 | | | | | | | | | 1 | 1 | 1 |
| | | | | | | | | | | | | 1 | | | | | 1 | | | | 0 | 0 | | | | | | | 1 | 1 | 1 |
| | | | | | | | | | | | | 1 | | | | | 1 | | | | 0 | 1 | | | 1 | | | | 0 | 0 | 1 |
| | | | | | | | | | | | | 1 | | | | | 1 | | | | 0 | 1 | | | | 1 | | | 0 | 0 | 1 |
| | | | | | | | | | | | | 1 | | | | | 1 | | | | 0 | 1 | | | | 0 | | 0 | 1 | 1 | 1 |
| | | | | | | | | | | | | 1 | | | | | 1 | | | | 1 | 0 | | 1 | | | | | 0 | 0 | 1 |
| | | | | | | | | | | | | 1 | | | | | 1 | | | | 1 | 0 | | | | | | 1 | 0 | 0 | 1 |
| | | | | | | | | | | | | 1 | | | | | 1 | | | | 1 | 0 | | | 1 | | | | 1 | 1 | 1 |
| | | | | | | | | | | | | 1 | | | | | 1 | | | | 1 | 0 | | | | | 1 | | 1 | 1 | 1 |
| | | | | | | | | | | | | 1 | | | | | 1 | | | | 1 | 0 | | 0 | 0 | 0 | 0 | | 1 | 1 | 1 |
| | | | | | | | | | | | | 1 | | | | 0 | 0 | | | | | | | | | | | | 0 | 0 | 1 |
| | | | | | 1 | | | | | | 1 | | | | | | 1 | | 1 | | | | | | | 0 | | 0 | 1 | 1 | 0 |
| | | | | 1 | | | | | | | 1 | | | | | | 1 | | | | | 1 | | | | | | | 1 | 1 | 0 |
| | | | | 1 | | | | | | | 1 | | | | | | 1 | | 0 | 0 | 0 | 0 | | | | | | | 0 | 1 | 0 |
| | | | | | | | | | | | 1 | | | | | | 1 | | | | 1 | | 1 | | | | | | 0 | 1 | 0 |
| | | | | | | | | | | | 1 | | | | | | 1 | | | | | 1 | | | | | | 1 | 0 | 1 | 0 |
| | | | | | | | | | | | 1 | | | | | | 1 | | | | | 1 | | | | | | | 0 | 1 | 0 |
| | | | | | | | | | | | 1 | | | | | | 1 | | | | | 1 | 1 | | | | | | 0 | 1 | 0 |
| | | | | | | | | | | | 1 | | | | | | 1 | | | | | | 1 | | | | | 1 | 0 | 1 | 0 |
| | | | | | 0 | | | | | | 1 | | | | | | 1 | | | | | 1 | | | | | | | 1 | 1 | 1 |
| | | | | | 0 | | | | | | 1 | | | | | | 1 | | | | | | 1 | | | 0 | | 0 | 1 | 1 | 1 |
| | | | | | 0 | | | | | | 1 | | | | | | 1 | | | | | | | 1 | | | | | 1 | 1 | 1 |
| | | | | | | | | | | | 1 | | | | | | 0 | | | | | | | | | | | | 0 | 1 | 0 |
| | | | | | | | | | | | | | 1 | | | | | | | | | | | | | | | | 0 | 1 | 1 |
| | | | | | 0 | 0 | | | | | | | | 1 | | | | | | | | | | | | | | | 1 | 0 | 0 |
| | | | | | 0 | 0 | 0 | | | | | | | | 1 | | | | | | | | | | | | | | 1 | 0 | 1 |
| | | | | | 0 | 0 | 0 | 0 | | | | | | | | 1 | | | 1 | | | | | | | | | | 0 | 1 | 1 |
| | | | | | 0 | 0 | 0 | 0 | | | | | | | | 1 | | | | | 0 | | | | | | | | 1 | 0 | 0 |
| | | | | | 0 | 0 | 0 | 0 | 0 | | | | | | | | 1 | | | 1 | | | | | | | | | 1 | 1 | 1 |
| | | | | | 0 | 0 | 0 | 0 | 0 | | | | | | | | 1 | | | | | 1 | | | | | | | 1 | 1 | 1 |
| | | | | | 0 | 0 | 0 | 0 | 0 | | | | | | | | 1 | | | | 0 | 0 | | | | | | | 1 | 0 | 1 |
| | | | | | 0 | 0 | 0 | 0 | 0 | 0 | | | | | | | 1 | | | | | | | | | | | | 1 | 0 | 1 |
| | 1 | 0 | 0 | 0 | 0 | 0 | 0 | 0 | 0 | 0 | 0 | 0 | | | | | | | | | | | | | | | | | 1 | 1 | 0 |
| | 0 | 0 | 0 | 0 | 0 | 0 | 0 | 0 | 0 | 0 | 0 | 0 | | | | | | | | | | | | | | | | | 1 | 1 | 1 |

As shown in Table 5, even if the same code word is made to correspond to different data words, the code word can correctly be decoded into its original data word by checking the code patterns of the code word to be decoded and a total of 20 bits at specific bit locations in the four code words preceding and succeeding the code word to be decoded.

An embodiment of an encode apparatus according to the encode method as mentioned above, will be described referring to FIG. 1. A binary data stream is serially input through an input terminal 10 bit by bit to a shift register 12 of 3 bits. When receiving serially three bits of the binary data, the shift register 12 outputs as one data word in a parallel fashion. The data word of 3 bits as the binary data are successively supplied to latch circuits 14, 16, 18 and 20 cascade connected, at given timings. Then, successive four data words D, C, B, and A (the data word A precedes the remaining ones) are latched in the latch circuits 14, 16, 18 and 20, respectively. The data bits in the latch circuit 14, 16, 18 and 20 are input to a data/code converter 22. The converter 22 generates a code word of 9 bits in response to those four data words.

Figure 2:
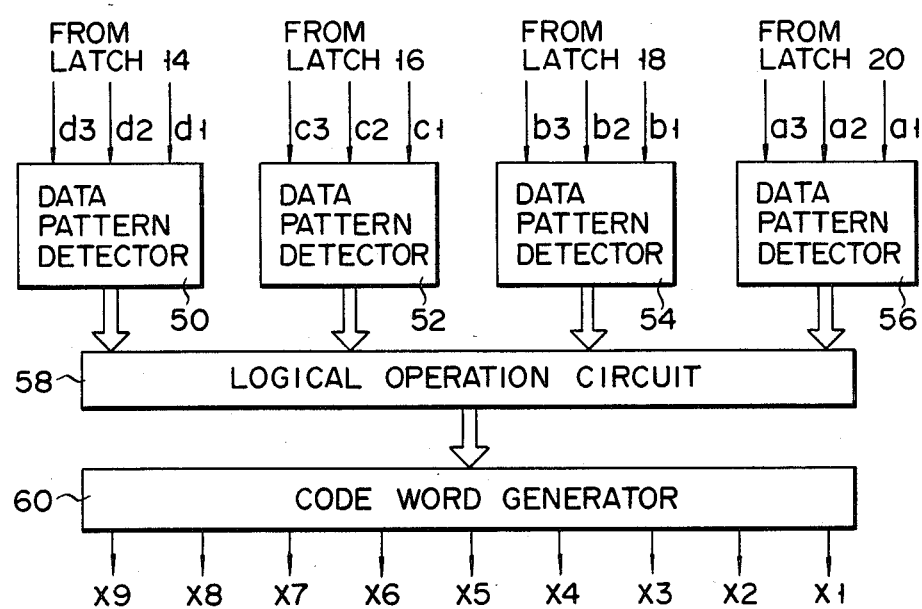
FIG. 2 is a block diagram illustrating in detail a data/code converter used in FIG. 1.
Figure 3:
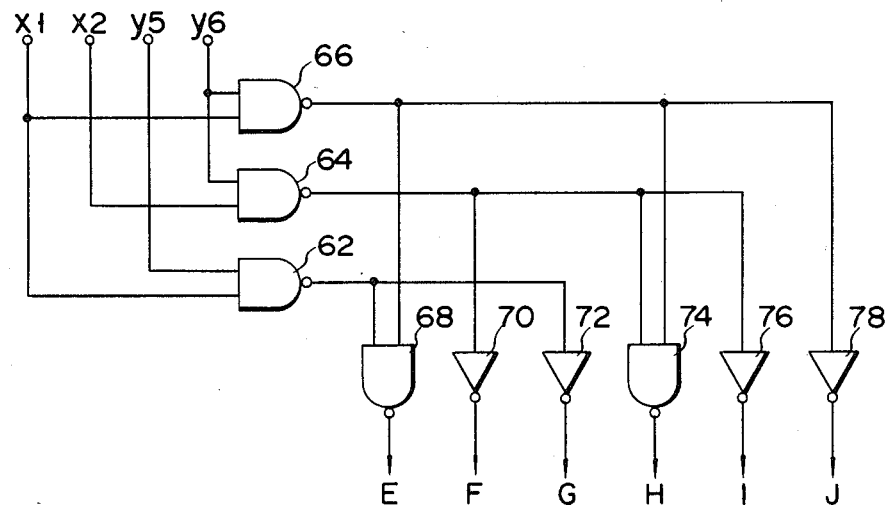
FIG. 3 is a circuit diagram illustrating in detail a merging control circuit in FIG. 1.

A schematic illustration of the converter 22 is shown in FIG. 2. The data words from the latch circuits 14, 16, 18 and 20 are respectively input to data pattern detectors 50, 52, 54 and 56. Using the data patterns of the data words detected by the data pattern detectors 50, 52, 54 and 56, a predetermined logical processing according to the data word B is executed by a logic operation circuit 58.

The logic operations circuit 58 produces a binary signal corresponding to the combination of the data words B, C and D, only the data word B or the combination of the data words A, B and C. The output signal from the logic operation circuit 58 is supplied to the code word generator 60 which is a read only memory storing the code words shown in Table 4 in the respective addresses. The read only memory is addressed by the logic operation circuit output and outputs the addressed code word X (x1 to x9). The code word X corresponds to the data word B latched in the latch circuit 18.

Returning back to FIG. 1, the output code word X from the data/code converter 22 is latched in a latch circuit 24 at a predetermined timing, and is stored therein as a code word Y preceding the code word X output from the converter 22. The code bits x1 and x2 of the code word X are input to the latch circuit 24 through EX-OR gates 26 and 28. The EX-OR gates 26 and 28 cooperate to form a merging circuit 30, which modifies the code bits x1 and x2 to provide code bits y1 and y2 under predetermned conditions. The code word in the latch circuit 24 are transferred to the shift register 32 of 9 bits as the code word X is loaded from the converter 22 into the latch circuit 24. Therefore, as the converter 22 produces the code word X, the latch circuit 24 latches the code word Y preceding the code word X. Also at this time, the shift register 32 stores the code word Z preceding the code word Y. The code bits y5 to y9 in the output code word Y from the latch circuit 24 are input to the shift register 32, via EX-OR gates 34, 36, 38, 40 and 42 cooperatively forming a merging circuit 44. The merging circuit 44 modifies the code bits y5 to y9 to provide code bits z5 to z9. The shift register 32 produces the code word Z of 9 bits bit by bit in a serial fashion and a code word stream is output through an output terminal 46. The EX-OR gates 26, 28, 34, 36, 38, 40 and 42 are controlled by the output signals E to J from a merging control circuit 48 on the basis of the code bits x1, x2, y5 and y6.

The merging control circuit 48 is composed of NAND gates 62, 64 and 66 each receiving two of the code bits x1, x2, y5 and y6, and a NAND gate 68, inverters 70 and 72, a NAND gate 74, and inverters 76 and 78, which are for processing the outputs of the NAND gates 62, 64 and 66. The output signals E to J of the merging control circuit 48 are given as follows:

$$E = x1(y5 + y6) \quad (4)$$

$$F = I = x2y6 \quad (5)$$

$$G = x1y5 \quad (6)$$

$$H = (x1 + x2)y6 \quad (7)$$

$$J = x1y6 \quad (8)$$

The control signal E is used for the merging of the code bit x1; the control signal F for the merging of the code bit x2; the control signal G for the merging of the code bits y5 and y7; the control signal H for the merging of the code bit y6; the control signals I and J for the merging of the code bits y8 and y9.

The code words are merged under control of those control signals E to J as shown in Table 3. When the code bits x1 and y6 are "1", the merging circuit 48 produces the following control signals $$E = H = J = \text{"1"}$$

$$F = G = I = \text{"0"}$$

with those control signals, the merging circuit 30 performs the following code inversions $$y1 = x1 \oplus E = \overline{x1} \quad (9)$$

$$y2 = x2 \oplus F = x2 \quad (10)$$

where $\oplus$ indicates an exclusive OR operation. The merging circuit 44 performs the following code inversions.

$$z5 = y5 \oplus G = \overline{y5} \quad (11)$$

$$z6 = y6 \oplus H = \overline{y6} \quad (12)$$

$$z7 = y7 \oplus G = \overline{y7} \quad (13)$$

$$z8 = y8 \oplus I = y8 \quad (14)$$

$$z9 = y9 \oplus J = \overline{y9} \quad (15)$$

This indicates that the inversion process of the condition 1 in Table 3 is executed. Finally, the following code inversion is performed:

$$y1 = \overline{x1} = \text{"0"},$$

$$z6 = \overline{y6} = \text{"0"},$$

$$z9 = \overline{y9} = \text{"1"}, \text{ and}$$

the other codes remain unchanged.

Similarly, when the codes X2 and Y6 are 1"1", the following code inversions are performed according to the condition 2 in table 3:

$$y2 = \overline{x2} = \text{"0"},$$

$$z6 = \overline{y6} = \text{"0"},$$

$$z8 = \overline{y8} = \text{"1"}, \text{ and}$$

the other codes remain unchanged.

Further, when the codes X1 and X5 are "1", the following code inversions are performed according to the condition 3 in Table 3:

$$y1 = \overline{x1} = \text{"0"},$$

$$z5 = \overline{y5} = \text{"0"},$$

$$z7 = \overline{y7} = \text{"1"}, \text{ and}$$

the other codes remain unchanged.

Thus, the shift register 32 produces code words (z1 to z9) forming a code word stream having 5 to 19 "0" codes consecutively arrayed between adjacent two "1" codes. The code word streams consisting of the code words (z1 to z9) are recorded in a magnetic tape, a magnetic disc, etc. in a high density.

Figure 4:
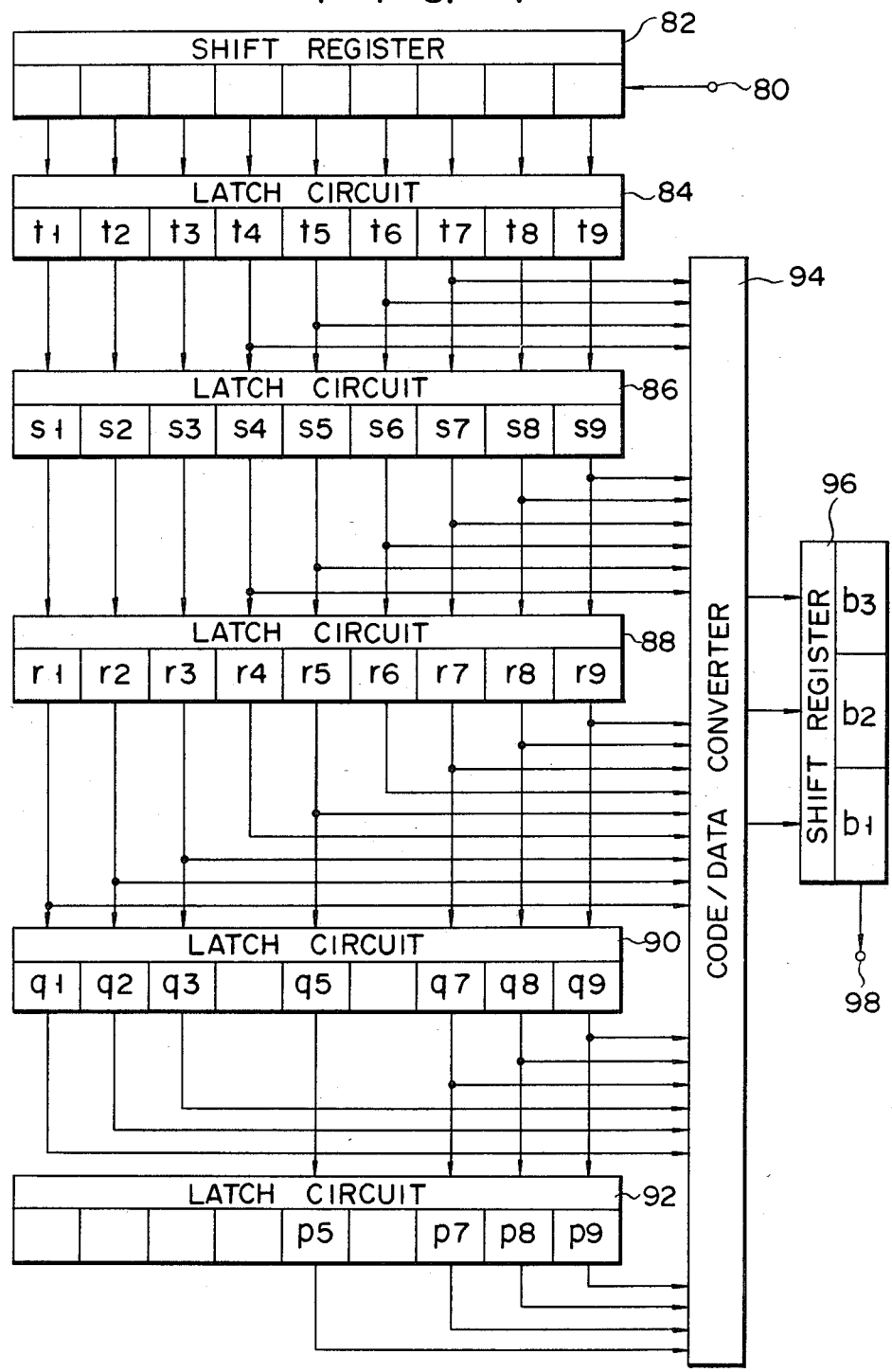
FIG. 4 is a block diagram of a decode apparatus for decoding a code word stream, obtained by the first embodiment of the present invention, into a data stream.

The decoding of the code word streams thus recorded is performed by a decode apparatus as shown in FIG. 4. A binary code stream picked up from the recording medium is serially input bit by bit into a shift register 82 of 9 bits, through a serial input terminal 80. When receiving 9 bits binary codes in synchronism with a predetermined synchronous signal, the shift register 82 produces in parallel fashion those codes as one code word. The 9 bits codes of the code word are successively supplied to and latched in latch circuits 84, 86, 88, 90 and 92 connected in a cascade fashion, at predetermined timings. Accordingly, latched in the latch circuits 84, 86, 88, 90 and 92 are five successive code words T, S, R, Q and P (P precedes the remaining ones), respectively. Of those code words in the latch circuits 84, 86, 88, 90 and 92, predetermined code bits are input to a code/data converter 94. In the converter 94, the code word R is decoded according to Table 5, and the data word B (b1 to b3) is obtained. All the bits (r1 to r9) of the code word R to be decoded and the last three bits (q7 to q9) of the code word Q preceding the code word R are judged whether the code pattern of these code bits is listed in Table 5 or not. If the code pattern is listed, the data word corresponding to the code pattern is produced. If the code pattern is not listed, the other code bits are considered to find the same pattern in Table 5.

Through this judgement, the code word R is correctly decoded into the original data word B according to the relationship shown in Table 5. The data word B is converted in the data form from parallel to serial fashion by the shift register 96, and are serially output bit by bit from the output terminal 98.

As seen from the foregoing description, the encode/decode apparatus according to Tables 3, 4 and 5 is realized.

The relationships between the data words and the code words are not limited to those in Table 4. Even if the code words shown in Table 4, are used, it is sufficient that the data word and the code word are related in one to one correspondence, and that the conversion conditions are set up according to the relationship. Specifically, in Table 4, the data word (000) is changed to any one of II to VIII, and the corresponding code word and conditions are also correspondingly changed. In this case, the decode table shown in Table 5, of course, are correspondingly changed.

The data/code converter 22 may be replaced by an encoder comprising logic gates. The encoder produces the following code word X (x1 to x9) based on the four data words A, B, C and D.

$$x1 = \bar{b}1\bar{b}2\bar{b}3 + \bar{b}1\bar{b}2b3c1c2c3\bar{d}1d2\bar{d}3 + a1b1\bar{b}2\bar{b}3 + \quad (16)$$

$$b1b2\bar{b}3(\bar{c}1\bar{c}2 + c1c2) + \bar{a}1a2a3b1b2b3(\bar{c}1\bar{c}2c3 + c1\bar{c}2\bar{c}3)$$

$$x2 = \overline{\bar{b}1\bar{b}2b3\bar{c}1c2c3} + \overline{\bar{b}1\bar{b}2b3\bar{d}1d2\bar{d}3} + (a1a2 + a1a3)b1b2b3 + \quad (17)$$

$$b1b2b3(\bar{c}1\bar{c}2 + c1c2)$$

$$x3 = \overline{\bar{b}1\bar{b}2\bar{b}3} + \bar{a}1a2\bar{a}3b1b2\bar{b}3c1\bar{c}2c3 + (\bar{a}1a3 + \quad (18)$$

$$a1\bar{a}2\bar{a}3)b1b2b3c1\bar{c}2c3$$

$$x4 = \overline{\bar{b}1\bar{b}2b3\bar{c}1c2\bar{c}3} + \bar{b}1b2b3(\bar{d}1\bar{d}2 + d1d2) + \quad (19)$$

$$\bar{a}1a2a3b1b2\bar{b}3(\bar{c}1\bar{c}2 + c1\bar{c}2)$$

$$x5 = b1\bar{b}2\bar{b}3 + \bar{a}1\bar{a}2a3b1b2\bar{b}3(\bar{c}1c2 + c1\bar{c}2) + \bar{a}1a2a3b1b2b3\bar{c}1c2\bar{c}3 \quad (20)$$

$$x6 = b1\bar{b}2b3 + a1b1\bar{b}2\bar{b}3 + \bar{a}1\bar{a}2\bar{a}3b1b2\bar{b}3 + b1b2(\bar{c}1\bar{c}2 + c1c2) + \quad (21)$$

$$(a1a2 + a1a3)b1b2b3$$

$$x7 = \bar{b}1\bar{b}2b3c1c2(\bar{d}1d2 + d1\bar{d}2) + \bar{b}1\bar{b}2b3c1c2c3\bar{d}1d2\bar{d}3 + \quad (22)$$

$$\bar{b}1b2b3c1c2\bar{c}3(\bar{d}1d2 + d1\bar{d}2) + \bar{a}1a2\bar{a}3b1b2\bar{b}3c1c2c3 +$$

$$\bar{a}1a3b1b2b3\bar{c}1c2c3$$

$$x8 = \bar{b}1\bar{b}2b3c1c2c3(\bar{d}1d2 + d1\bar{d}2) + \bar{a}1a2\bar{a}3b1b2\bar{b}3c1\bar{c}2\bar{c}3 + \quad (23)$$

$$(\bar{a}1a3 + a1\bar{a}2\bar{a}3)b1b2b3c1\bar{c}2\bar{c}3$$

$$x9 = \bar{b}1\bar{b}2b3c1c2c3(\bar{d}1d2d3 + d1\bar{d}2\bar{d}3) + \bar{b}1\bar{b}2b3c1c2\bar{c}3(\bar{d}1d2d3 + \quad (24)$$

$$d1\bar{d}2\bar{d}3) + \bar{b}1b2b3c1c2c3(\bar{d}1\bar{d}2 + d1\bar{d}2) + \bar{a}1a2\bar{a}3b1b2\bar{b}3c1\bar{c}2c3 +$$

$$(\bar{a}1a3 + a1\bar{a}2\bar{a}3)b1b2b3c1\bar{c}2c3$$

Similarly, the code/data converter 94 may be replaced by a decoder comprising logic gates. The decoder produces the following data word B (b1 to b3) based on the 29 code bits.

$$b1' = r4(p9 + q1 + \bar{q}7) + q7(r7 + \bar{p}7\bar{p}9\bar{q}1\bar{r}4\bar{r}5\bar{r}6\bar{r}8\bar{r}9) + \quad (25)$$

$$(q8 + r2)r8s5 + (q8 + r2)r9(s7t4 + s7t7 + s8t5 + s8t7) +$$

$$(q8\bar{r}5\bar{r}6 + \bar{q}3q9\bar{r}6 + r1)\bar{r}7\bar{r}8\bar{r}9 + (q9 + r1)r7(s5 + s6 + \bar{s}4\bar{s}7) +$$

$$r3(\bar{r}9 + s7 + \bar{s}6\bar{s}8\bar{s}9 + s8t5 + s8t7) + r2\bar{r}8\bar{r}9 + \bar{q}7\bar{q}8\bar{q}9\bar{r}1r7s4$$

$$b2' = \bar{p}9\bar{q}1q7(r7 + \bar{p}7\bar{r}4\bar{r}5\bar{r}6\bar{r}8\bar{r}9) + q8r5(p9 + q1 + p5\bar{q}2) + \quad (26)$$

$$q8r7 + q8r8s5 + (q8 + r2)r9(s7t4 + s7t7 + s8t5 + s8t7) +$$

$$(q8\bar{r}5\bar{r}6 + \bar{q}3q9\bar{r}6 + r1)\bar{r}7\bar{r}8\bar{r}9 + \bar{q}3q9(\bar{r}6 + r9) + r2\bar{r}8s5 +$$

$$r2\bar{r}8\bar{r}9 + \bar{q}7\bar{q}8r5 + (q9 + r1)r7(s5 + s6 + \bar{s}4\bar{s}7) + \bar{q}3q9r8\bar{s}5\bar{s}7 +$$

$$\bar{q}7\bar{q}8\bar{q}9(\bar{r}6 + \bar{r}1\bar{r}7\bar{s}4 + \bar{r}1\bar{r}2r8\bar{s}5\bar{s}7 + \bar{r}1\bar{r}2\bar{r}3r9)$$

$$b3' = \bar{p}9\bar{q}1q7(r4 + r7s6 + r7\bar{s}5) + q7(r6 + r8 + r9) + \quad (27)$$

$$q8(r5 + r7) + r1r8\bar{s}5\bar{s}7 + (\bar{p}7\bar{p}9\bar{q}1q7 +$$

$$\bar{q}3\bar{q}7\bar{q}8\bar{q}9\bar{r}1\bar{r}2\bar{r}3)\bar{r}4\bar{r}5\bar{r}6\bar{r}7\bar{r}8\bar{r}9 + \bar{q}3q9r7(s6 + \bar{s}4\bar{s}5\bar{s}7) + \bar{q}3q9(\bar{r}6 +$$

$$\bar{r}7\bar{r}8 + r9 + \bar{s}5\bar{s}7r8) + \bar{q}3q9r8(s5 + s7) + \bar{q}3q9r7(s4 + s7) +$$

$$r1r7(s6 + \bar{s}4\bar{s}5\bar{s}7) + r1(r9 + \bar{r}7\bar{r}8) + r3(\bar{r}9 + q3s6 + q3s8\bar{t}5\bar{t}7 +$$

$$q3s9) + r3(s7 + \bar{s}6\bar{s}8\bar{s}9 + s8t5 + s8t7) + \bar{q}7\bar{q}8r5 + \bar{q}7\bar{q}8\bar{q}9\bar{r}1r7s4$$

$$b1 = \overline{b1'} \quad (28)$$

$$b2 = \overline{b2'} \quad (29)$$

$$b3 = \overline{b3'} \quad (30)$$

A second embodiment of an encode method according to the present invention will be described. While, in the first embodiment, in a fundamental encode from the data word to the code word, the last 3 bits in the code word are all "0"s", in the second embodiment, the first 3 bits are all "0's". The second embodiment employs a reversed sequential order of the code bits in the code word of that in the first embodiment, as shown in Table 6.

TABLE 6

| Data word B | | | code word X | | | | | | | | |
|---|---|---|---|---|---|---|---|---|---|---|---|
| b1 | b2 | b3 | x1 | x2 | x3 | x4 | x5 | x6 | x7 | x8 | x9 |
| A 0 | 0 | 0 | 0 | 0 | 0 | 0 | 0 | 0 | 0 | 0 | 1 |
| 0 | 0 | 1 | 0 | 0 | 0 | 0 | 0 | 0 | 0 | 1 | 0 |
| 0 | 1 | 0 | 0 | 0 | 0 | 0 | 0 | 0 | 1 | 0 | 0 |
| 0 | 1 | 1 | 0 | 0 | 0 | 0 | 1 | 0 | 0 | 0 | 0 |
| 1 | 0 | 0 | 0 | 0 | 0 | 1 | 0 | 0 | 0 | 0 | 0 |
| 1 | 0 | 1 | 0 | 0 | 1 | 0 | 0 | 0 | 0 | 0 | 0 |
| B 1 | 1 | 0 | 0 | 0 | 1 | 0 | 0 | 0 | 0 | 0 | 1 |
| 1 | 1 | 1 | 0 | 0 | 1 | 0 | 0 | 0 | 0 | 1 | 0 |

In the fundamental correspondence thus set up between the data word and the code word, as for the merging of the code word, the combinations of the bit codes to be inverted are exchanged with each other between the code words X and Y. The bit combination in the code word X in the first embodiment is that in the code word Y in the second embodiment. The bit combination in the code word Y in the first embodiment is that in the X code word in the second embodiment. A merging rule in the second embodiment is shown in Table 7.

TABLE 7

| | Code word Y | | | | | | | | | Cord word x | | | | | | | | |
|---|---|---|---|---|---|---|---|---|---|---|---|---|---|---|---|---|---|---|
| | y1 | y2 | y3 | y4 | y5 | y6 | y7 | y8 | y9 | x1 | x2 | x3 | x4 | x5 | x6 | x7 | x8 | x9 |
| 1 | * | * | * | * | * | * | * | 0 | 1 | 0 | 0 | 0 | 1 | 0 | * | * | * | * |
| | | | | | | | | | ↓ | ↓ | | | ↓ | | | | | |
| | * | * | * | * | * | * | * | 0 | 0 | 1 | 0 | 0 | 0 | 0 | * | * | * | * |
| 2 | * | * | * | * | * | * | * | 1 | 0 | 0 | 0 | 0 | 1 | 0 | * | * | * | * |
| | | | | | | | | ↓ | | | ↓ | | ↓ | | | | | |
| | * | * | * | * | * | * | * | 0 | 0 | 0 | 1 | 0 | 0 | 0 | * | * | * | * |
| 3 | * | * | * | * | * | * | * | 0 | 1 | 0 | 0 | 0 | 0 | 1 | * | * | * | * |
| | | | | | | | | | ↓ | | | ↓ | | ↓ | | | | |
| | * | * | * | * | * | * | * | 0 | 0 | 0 | 0 | 1 | 0 | 0 | * | * | * | * |

As shown, for the merging, when the code bits x4 and y9 are "1" in the code word X and the code word Y, the code bits x4 and x9 are inverted to "0" and the code bit x1 is inverted to "1". When the code bits x4 and y8 are "1", the code bits x4 and y8 are inverted to "0" and the code bit x2 to "1". Further, when the code bits x5 and y9 are "1", the code bits x5 and y9 are inverted to "0" and the code bit x3 to "1". By effecting such code bit inversion, the condition d=5 is basically satisfied, as in the first embodiment. However, even if such code inversion is employed, a desired code word stream could not always be obtained for every type of the data word stream. Further, an additional consideration must taken for the decoding processing. Those are exactly the same as those in the first embodiment. Therefore, it is necessary to effect the encoding of the data word C to be encoded according to a data pattern of the data word C, the data words A and B preceding the data word C, and the data word D succeeding the data word C, as shown in Table 8.

In the first embodiment, the encoding of a specific data word is performed on the basis of the data word preceding the specific one and the two data words succeeding the specific one. In the second embodiment, the fundamental sequential order of bits in the code word is reverse to that in the first embodiment, as previously mentioned. Therefore, the two data words preceding the data word to be encoded and a data word succeeding the data word to be encoded are required for the encoding.

TABLE 8

| | | Data word B | Code word X | Condition |
|---|---|---|---|---|
| 1 | I | 0 0 0 | 0 0 1 0 0 0 0 0 1 | B = 110 and A = 010, 011, 100 or 101 |
| | | | 0 0 1 0 0 0 0 0 1 | B = 111 and A = 010, 011, 100 or 101 |
| | | | 0 0 0 0 0 0 0 0 1 | Other than the above |
| | II | 0 0 1 | 0 1 0 0 0 0 0 1 0 | B = 110 and A = 010, 011, 100 or 101 |
| | | | 0 0 1 0 0 0 0 0 1 | B = 111 and A = 010 |
| | | | 1 0 0 0 0 0 0 1 0 | B = 111 and A = 011 or 100 |
| | | | 0 0 0 0 0 0 0 1 0 | Other than the above |
| | III | 0 1 0 | 1 0 0 0 0 0 1 0 0 | B = 110 and A = 011 or 100 |
| | | | 1 0 0 0 0 0 1 0 0 | B = 111 and A = 010, 011, 100 or 101 |
| | | | 0 0 0 0 0 0 1 0 0 | Other than the above |
| | IV | 0 1 1 | 0 0 1 0 0 0 0 0 0 | B = 110 and A = 010, 011, 100 or 101 |
| | | | 0 0 0 0 0 1 0 0 0 | Other than the above |
| 2 | V | 1 0 0 | 0 0 0 0 1 0 0 0 0 | Uncondition |
| | VI | 1 0 1 | 0 0 0 1 0 0 0 0 0 | Uncondition |
| 3 | VII | 1 1 0 | 0 0 0 1 0 0 0 0 0 | D = 000 and B = 010, 011, 100 or 101 |
| | | | 0 0 0 0 1 0 0 0 0 | D = 001 and B = 010, 011, 100 or 101 |
| | | | 0 0 1 0 0 0 0 0 0 | D = 010 and B = 011 |
| | | | 0 1 0 0 0 0 0 0 0 | D = 010 and B = 100 |
| | | | 1 0 0 0 0 1 0 0 | D = 010 and B = 101 |
| | | | 0 0 0 0 0 0 0 0 0 | D = 010 and B = 010 |
| | | | 0 0 0 0 0 1 0 0 0 | D = 011 and B = 010, 011, 100 or 101 |
| | | | 0 0 0 1 0 0 0 0 1 | Other than the above |
| | | 1 1 1 | 0 0 0 0 0 0 0 0 0 | D = 000 and B = 010, 011, 100 or 101 |
| | | | 0 0 0 0 0 0 0 0 0 | D = 010 and B = 010, 011, 100 or 101 |
| | | | 0 0 0 0 0 0 0 0 0 | D = 011 and B = 010 |
| | | | 0 0 0 0 1 0 0 0 0 | D = 001 and B = 010 |
| | | | 0 0 1 0 0 0 0 0 0 | D = 001 and B = 011 |
| | VIII | | 0 1 0 0 0 0 0 0 0 | D = 001 or 100 and B = 100 |
| | | | 1 0 0 0 0 0 1 0 0 | D = 001, 011 or 100 and B = 101 |
| | | | 0 0 1 0 0 0 0 0 1 | D = 011 and B = 011 |
| | | | 0 1 0 0 0 0 0 0 1 | D = 011 and B = 100 |
| | | | 0 0 0 0 0 0 0 0 0 | D = 100 and B = 010 or 011 |
| | | | 0 0 0 1 0 0 0 1 0 | Other than the above |

Figure 5:
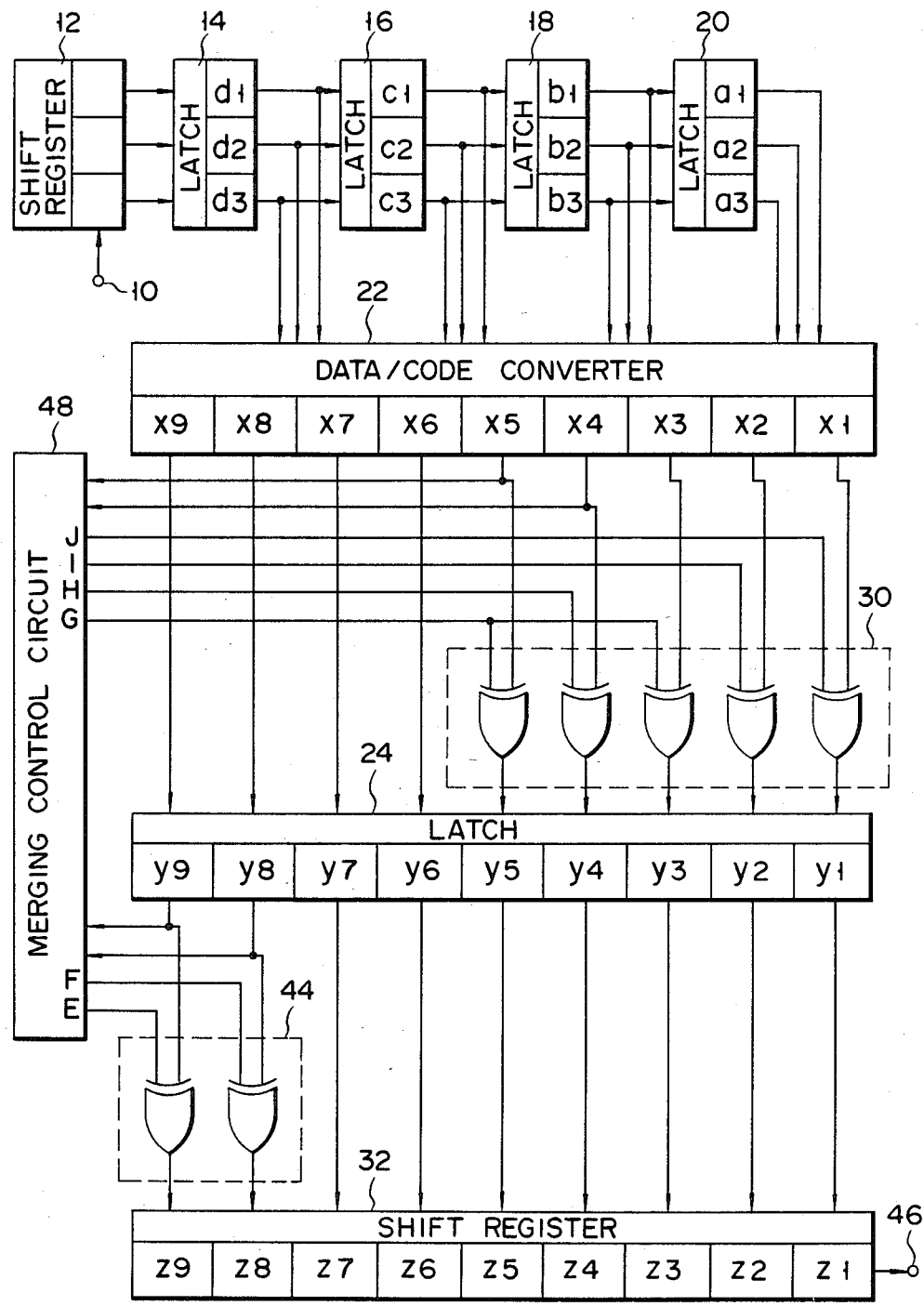
FIG. 5 is a block diagram of an encode apparatus for realizing another encode method according to the present invention.

Then, the merging shown in Table 7 is applied to the code word thus converted. The result is to obtain a code word stream having 5 to 19 "0" codes between two adjacent "1" codes. An encode apparatus for effecting such an encoding may be arranged as shown in FIG. 5. In FIG. 5, like reference symbols are used for like portions in the first embodiment. In the merging circuit 30, the code bits x1 to x5 in the code word X are subjected to the merging processing. The merging circuit 44 merges the code bits y8, y9 in the code word Y. The merging control circuit 48, using four code bits x4, x5, y8, y9, generates the following six control signals.

$$E = y9(x4 + x5) \tag{31}$$

$$F = I = x4y8 \tag{32}$$

$$G = x5y9 \tag{33}$$

$$H = x4(y8 + y9) \tag{34}$$

$$J = x4y9 \quad (35)$$

Under control of these control signals, when the bits x4 and x9 are "1", the following code inversions are performed by the exclusive ORing process and the merging processing of the condition 1 in Table 7 is performed:

$z9 = \bar{y}9 = $ "0", $y4 = \bar{x}4 = $ "0", $y1 = \bar{x}1 = $ "1", and the other code bits remain unchanged. When the code bits x4 and y8 are "1", the following code inversion is performed and the merging processing of the condition 2 in Table 7 is performed:

$y4 = \bar{x}4 = $ "0", $z8 = \bar{x}8 = $ "0", $y2 = \bar{x}2 = $ "1", and the other code bits remain unchanged.

When the code bits x5 and y9 are "1", the following code conversion is performed and the merging processing of the condition 3 in Table 7 is performed:

$z9 = \bar{y}9 = $ "0", $y5 = \bar{x}5 = $ "0", $y3 = x3 = $ "1", and the other code bits remain unchanged. It is evident that the data/code converter 22 performs the encoding of the data word C. The remaining portions operate like in FIG. 1.

The decoding of the code word stream thus encoded is performed as shown in Table 9.

TABLE 9

| p3 | p4 | p5 | p6 | q1 | q2 | q3 | q4 | q5 | q6 | r1 | r2 | r3 | r4 | r5 | r6 | r7 | r8 | r9 | s1 | s2 | s3 | s7 | s8 | s9 | t1 | t2 | t3 | t5 | c1 | c2 | c3 |
|---|---|---|---|---|---|---|---|---|---|---|---|---|---|---|---|---|---|---|---|---|---|---|---|---|---|---|---|---|---|---|---|
| | | | | | | | | | | | | | 1 | | | | | | 1 | | | | 0 | 0 | | | | | 1 | 1 | 0 |
| | | | | | | | | | | | | | 1 | | | | | | 1 | | | | 0 | 1 | | | | | 0 | 1 | 1 |
| | | | | | | | | | | | | | 1 | | | | | | 1 | | | | 1 | 0 | | | | | 0 | 1 | 1 |
| | | | | | | | | | | | | | | 1 | | | | | 1 | | | | | | | | | | 1 | 1 | 1 |
| | | | | | | | | | | | | 1 | | | | | | | 1 | | | | | | | | | | 1 | 1 | 0 |
| | | | | | | | | | | | 1 | | | | | | | | 1 | | | | 1 | 0 | | | | | 0 | 1 | 1 |
| | | | | | | | | | | | 1 | | | | | | | | 1 | | | | 0 | 1 | | | | | 0 | 1 | 1 |
| | | | | | | | | 0 | 1 | | 1 | | | | | | | | 1 | | | | 0 | 0 | | | | | 0 | 0 | 1 |
| | | | | | | | | 1 | 0 | | 1 | | | | | | | | 1 | | | | 0 | 0 | | | | | 0 | 0 | 0 |
| | | | | | | | | 0 | 0 | | 1 | | | | | | | | 1 | | | | 0 | 0 | | | | | 0 | 0 | 0 |
| | | | | | | | | | | | | 1 | | | | | | | 1 | | | | | | | | | | 1 | 1 | 0 |
| | | | | | | | | | | 1 | | | | | | | | | 1 | | | | | | | | | | 1 | 1 | 0 |
| | | | | | | | | | | 0 | 0 | 0 | 0 | 0 | 0 | | | | 1 | | | | 0 | 0 | | | 0 | | 0 | 0 | 0 |
| | | | | | | | | | | 0 | 0 | 0 | 0 | 0 | 0 | | | | 1 | | | | | 1 | | | | | 1 | 1 | 1 |
| | | | | | | | | | | 0 | 0 | 0 | 0 | 0 | 0 | | | | 1 | | | | 1 | | | | | | 1 | 1 | 1 |
| | | | | | | | | | | 0 | 0 | 0 | 0 | 0 | 0 | | | | 1 | 1 | | | | | | | | | 1 | 1 | 1 |
| | | | | | | | | | | | | | 1 | | | | | | 1 | | | | | | 1 | | | | 1 | 1 | 0 |
| | | | | | | | | | | | | 1 | | | | | | | 1 | 1 | | | | | | | | | 1 | 1 | 0 |
| | | | | | | | | | | | 1 | | | | | | | | 1 | | | 1 | | | | | | | 1 | 0 | 0 |
| | | | | | | | | | | | 1 | | | | | | | | 1 | | | | | | | | | | 1 | 0 | 0 |
| | | | | | | | | | | | 1 | | | | | | | | 1 | | | | 0 | | | | | 1 | 1 | 0 | 0 |
| | | | | | | | | | | | | 1 | | | | | | | 1 | | | | | | | | | | 1 | 1 | 1 |
| | | | | | | | | | | 1 | | | | | | | | | 1 | | | | | | | | | | 1 | 0 | 0 |
| | | | | | | | 0 | | | | 1 | | | | | | | | 1 | | | | | | | | | | 1 | 1 | 1 |
| | | | | | | | 1 | | | 1 | | | | | | | | | 1 | | | | | | | | | | 0 | 0 | 1 |
| | | | | | 0 | 0 | | | | 1 | | | | | | | | | 1 | | | | | | | | | | 1 | 1 | 1 |
| 0 | 0 | 0 | 0 | | | 0 | 1 | | | 1 | | | | | | | | | 1 | | | | | | | | | | 1 | 1 | 1 |
| | 1 | | | | | 0 | 1 | | | 1 | | | | | | | | | 1 | | | | | | | | | | 1 | 1 | 1 |
| | | 1 | | | | 0 | 1 | | | 1 | | | | | | | | | 1 | | | | | | | | | | 0 | 0 | 1 |
| | | | 1 | | | 0 | 1 | | | 1 | | | | | | | | | 1 | | | | | | | | | | 0 | 0 | 1 |
| 1 | | | | | | 0 | 1 | | | 1 | | | | | | | | | 1 | | | | | | | | | | 0 | 0 | 1 |
| | | 1 | | | | 1 | 0 | | | 1 | | | | | | | | | 1 | | | | | | | | | | 0 | 0 | 1 |
| 1 | | | | | | 1 | 0 | | | 1 | | | | | | | | | 1 | | | | | | | | | | 1 | 1 | 1 |
| 0 | | 0 | | | | 1 | 0 | | | 1 | | | | | | | | | 1 | | | | | | | | | | 0 | 0 | 1 |
| | | | | | | | | | | 0 | 0 | 0 | 0 | 0 | | | | | 1 | | | | | | | | | | 1 | 0 | 1 |
| | | | | | | | | | | | | | | 1 | | | | | 1 | | 1 | | 0 | | | | | | 1 | 1 | 0 |
| | | | | | | | | | | | | | | 1 | | | | | 1 | | 1 | | 0 | | | | | | 0 | 0 | 0 |
| | | | | | | 0 | 0 | 0 | 0 | | | | | 1 | | | | | 1 | | | | 0 | | | | | | 0 | 0 | 0 |
| | | | | | | | | 1 | | | | | | 1 | | | | | 1 | | | | 0 | | | | | | 0 | 0 | 1 |
| | | | | | | | 1 | | | | | | | 1 | | | | | 1 | | | | 0 | · | | | | | 1 | 1 | 1 |
| | | | | | | 1 | | | | | | | | 1 | | | | | 1 | | | | 0 | | | | | | 1 | 1 | 1 |
| | | | | | | | | | | 1 | | | | | | | | | 1 | | 1 | | | | | | | | 1 | 1 | 0 |
| | | | | | | | | | | | 1 | | | | | | | | 1 | | 1 | | 0 | | | | | | 1 | 1 | 1 |
| | | | | | | | | 0 | | | 1 | | | | | | | | 1 | | | | 0 | | | | | | 1 | 0 | 1 |
| | | | | | | | | | 1 | | | | | | | | | | 1 | | 1 | | 0 | | | | | | 1 | 1 | 0 |
| | | | | | | | 1 | | | | | | | | | | | | 1 | | 1 | | 0 | | | | | | 1 | 1 | 0 |
| | | | | | | 1 | | | | | | | | | | | | | 1 | | | | 0 | | | | | | 1 | 1 | 1 |
| | | | | | | | | 1 | | | | | | | | | | | 1 | | 1 | | 0 | | | | | | 1 | 1 | 1 |
| | | | | | | | | | 0 | | 1 | | | | | | | | 1 | | | | 0 | | | | | | 1 | 1 | 0 |
| | | | | | | | | | | 1 | | | | | | | | | 1 | | 1 | | 0 | | | | | | 1 | 0 | 1 |
| | | | | | | | | | | 1 | | | | | | | | | 1 | | | | 0 | | | | | | 1 | 1 | 0 |
| | | | | | | | | | | | | 0 | 0 | 0 | 0 | | | | 1 | | 1 | | | | | | | | 1 | 1 | 1 |
| | | | | | | | | | | | | 0 | 0 | 0 | 0 | | | | 1 | | | | 0 | | | | | | 0 | 0 | 0 |

TABLE 9-continued

| p3 | p4 | p5 | p6 | q1 | q2 | q3 | q4 | q5 | q6 | r1 | r2 | r3 | r4 | r5 | r6 | r7 | r8 | r9 | s1 | s2 | s3 | s7 | s8 | s9 | t1 | t2 | t3 | t5 | c1 | c2 | c3 |
|---|---|---|---|---|---|---|---|---|---|---|---|---|---|---|---|---|---|---|---|---|---|---|---|---|---|---|---|---|---|---|---|
|  |  |  |  |  |  | 0 | 0 | 0 | 0 |  |  | 1 |  |  |  |  | 1 |  |  |  |  |  |  |  |  |  |  |  | 0 | 0 | 0 |
|  |  |  |  |  |  |  | 1 |  |  |  |  | 1 |  |  |  |  | 1 |  |  |  |  |  |  |  |  |  |  |  | 0 | 0 | 0 |
|  |  |  |  |  |  |  |  | 1 |  |  |  | 1 |  |  |  |  | 1 |  |  |  |  |  |  |  |  |  |  |  | 0 | 0 | 1 |
|  |  |  |  |  |  |  |  |  | 1 |  |  | 1 |  |  |  |  | 1 |  |  |  |  |  |  |  |  |  |  |  | 1 | 1 | 1 |
|  |  |  |  |  | 1 |  |  |  |  |  |  | 1 |  |  |  |  | 1 |  |  |  |  |  |  |  |  |  |  |  | 1 | 1 | 1 |
|  |  |  |  |  |  |  | 1 |  |  |  | 1 |  |  |  |  |  | 1 |  |  |  |  |  |  |  |  |  |  |  | 1 | 1 | 1 |
|  |  |  |  | 1 |  |  |  |  |  |  | 1 |  |  |  |  |  | 1 |  |  |  |  |  |  |  |  |  |  |  | 1 | 1 | 1 |
|  |  |  |  |  |  | 0 |  | 0 |  |  |  | 1 |  |  |  |  | 1 |  |  |  |  |  |  |  |  |  |  |  | 1 | 1 | 0 |
|  |  |  |  |  |  |  |  |  |  | 1 |  |  |  |  |  |  | 1 |  |  |  |  |  |  |  |  |  |  |  | 1 | 1 | 0 |
|  |  |  |  |  |  |  |  |  |  | 0 | 0 | 0 |  |  |  |  | 1 |  |  |  |  |  |  |  |  |  |  |  | 0 | 0 | 0 |
|  |  |  |  |  |  |  | 1 |  |  |  | 1 |  |  |  |  |  |  |  | 1 |  |  |  |  |  |  |  |  |  | 0 | 0 | 1 |
|  |  |  |  |  |  |  |  | 0 |  |  | 1 |  |  |  |  |  |  |  | 1 |  |  |  |  |  |  |  |  |  | 1 | 1 | 1 |
|  |  |  |  | 0 | 0 |  |  |  |  |  | 1 |  |  |  |  |  |  |  | 1 |  |  |  |  |  |  |  |  |  | 1 | 1 | 1 |
|  | 1 |  |  | 1 | 0 |  |  |  |  |  | 1 |  |  |  |  |  |  |  | 1 |  |  |  |  |  |  |  |  |  | 0 | 0 | 1 |
| 1 |  |  |  | 1 | 0 |  |  |  |  |  | 1 |  |  |  |  |  |  |  | 1 |  |  |  |  |  |  |  |  |  | 0 | 0 | 1 |
| 0 |  | 0 |  | 1 | 0 |  |  |  |  |  | 1 |  |  |  |  |  |  |  | 1 |  |  |  |  |  |  |  |  |  | 1 | 1 | 1 |
|  |  |  | 1 | 0 | 1 |  |  |  |  |  | 1 |  |  |  |  |  |  |  | 1 |  |  |  |  |  |  |  |  |  | 0 | 0 | 1 |
| 1 |  |  |  | 0 | 1 |  |  |  |  |  | 1 |  |  |  |  |  |  |  | 1 |  |  |  |  |  |  |  |  |  | 0 | 0 | 1 |
|  | 1 |  |  | 0 | 1 |  |  |  |  |  | 1 |  |  |  |  |  |  |  | 1 |  |  |  |  |  |  |  |  |  | 1 | 1 | 1 |
|  | 1 |  |  | 0 | 1 |  |  |  |  |  | 1 |  |  |  |  |  |  |  | 1 |  |  |  |  |  |  |  |  |  | 1 | 1 | 1 |
| 0 | 0 | 0 | 0 |  | 0 | 1 |  |  |  |  | 1 |  |  |  |  |  |  |  | 1 |  |  |  |  |  |  |  |  |  | 1 | 1 | 1 |
|  |  |  |  |  |  |  |  |  |  |  | 0 | 0 |  |  |  |  |  |  | 1 |  |  |  |  |  |  |  |  |  | 0 | 0 | 1 |
|  |  |  |  |  |  | 1 |  |  |  |  | 1 |  |  |  |  |  |  |  |  |  |  | 1 |  |  |  |  |  |  | 1 | 1 | 0 |
| 0 |  | 0 |  | 1 |  |  |  |  |  |  | 1 |  |  |  |  |  |  |  |  |  |  | 1 |  |  |  |  |  |  | 1 | 1 | 0 |
|  |  |  | 1 |  |  |  |  |  |  |  | 1 |  |  |  |  |  |  |  |  |  |  | 1 |  |  |  |  |  |  | 1 | 1 | 0 |
|  |  | 0 | 0 | 0 | 0 |  |  |  |  |  | 1 |  |  |  |  |  |  |  |  |  |  | 1 |  |  |  |  |  |  | 0 | 1 | 0 |
|  |  | 1 |  | 1 |  |  |  |  |  |  | 1 |  |  |  |  |  |  |  |  |  |  | 1 |  |  |  |  |  |  | 0 | 1 | 0 |
| 1 |  |  |  | 1 |  |  |  |  |  |  | 1 |  |  |  |  |  |  |  |  |  |  | 1 |  |  |  |  |  |  | 0 | 1 | 0 |
|  | 1 |  | 1 |  |  |  |  |  |  |  | 1 |  |  |  |  |  |  |  |  |  |  | 1 |  |  |  |  |  |  | 0 | 1 | 0 |
| 1 |  |  |  | 1 |  |  |  |  |  |  | 1 |  |  |  |  |  |  |  |  |  |  | 1 |  |  |  |  |  |  | 0 | 1 | 0 |
|  |  |  |  |  |  | 1 |  |  |  |  | 1 |  |  |  |  |  |  |  |  |  |  |  |  | 0 |  |  |  |  | 1 | 1 | 1 |
| 0 |  | 0 |  | 1 |  |  |  |  |  |  | 1 |  |  |  |  |  |  |  |  |  |  |  |  | 0 |  |  |  |  | 1 | 1 | 1 |
|  |  |  | 1 |  |  |  |  |  |  |  | 1 |  |  |  |  |  |  |  |  |  |  |  |  | 0 |  |  |  |  | 1 | 1 | 1 |
|  |  |  |  |  |  |  |  |  |  |  | 1 |  |  |  |  |  |  |  |  |  |  |  |  |  |  |  |  |  | 0 | 1 | 0 |
|  |  |  |  |  |  |  |  |  |  | 0 |  |  |  |  |  |  |  |  |  | 0 |  |  |  |  |  |  |  |  | 0 | 1 | 1 |
|  |  |  |  |  |  |  |  |  |  |  | 1 |  |  |  |  |  |  |  |  | 0 | 0 |  |  |  |  |  |  |  | 1 | 0 | 0 |
|  |  |  |  |  |  |  |  |  |  |  |  |  |  |  | 1 |  |  |  |  | 0 | 0 | 0 |  |  |  |  |  |  | 1 | 0 | 1 |
|  |  |  |  |  |  |  |  | 1 |  |  |  | 1 |  |  |  |  |  |  | 0 | 0 | 0 | 0 |  |  |  |  |  |  | 0 | 1 | 1 |
|  |  |  |  |  |  |  |  | 0 |  |  | 1 |  |  |  |  |  |  |  | 0 | 0 | 0 | 0 |  |  |  |  |  |  | 1 | 0 | 0 |
|  |  |  |  |  |  |  | 1 |  |  | 1 |  |  |  |  |  |  |  |  | 0 | 0 | 0 | 0 |  |  |  |  |  |  | 1 | 1 | 1 |
|  |  |  |  |  | 1 |  |  |  |  | 1 |  |  |  |  |  |  |  |  | 0 | 0 | 0 | 0 |  |  |  |  |  |  | 1 | 1 | 1 |
|  |  |  |  | 0 |  | 0 |  |  |  |  | 1 |  |  |  |  |  |  |  | 0 | 0 | 0 | 0 |  |  |  |  |  |  | 1 | 0 | 1 |
|  |  |  |  |  |  |  |  |  |  | 1 |  |  |  |  |  |  |  | 0 | 0 | 0 | 0 | 0 |  |  |  |  |  |  | 1 | 0 | 1 |
|  |  |  |  |  |  |  |  |  |  | 0 | 0 | 0 | 0 | 0 | 0 | 0 | 0 | 0 | 0 | 0 | 0 | 0 |  |  |  |  |  | 1 | 1 | 1 | 0 |
|  |  |  |  |  |  |  |  |  |  | 0 | 0 | 0 | 0 | 0 | 0 | 0 | 0 | 0 | 0 | 0 | 0 | 0 |  |  |  |  |  |  | 1 | 1 | 1 |

Figure 6:
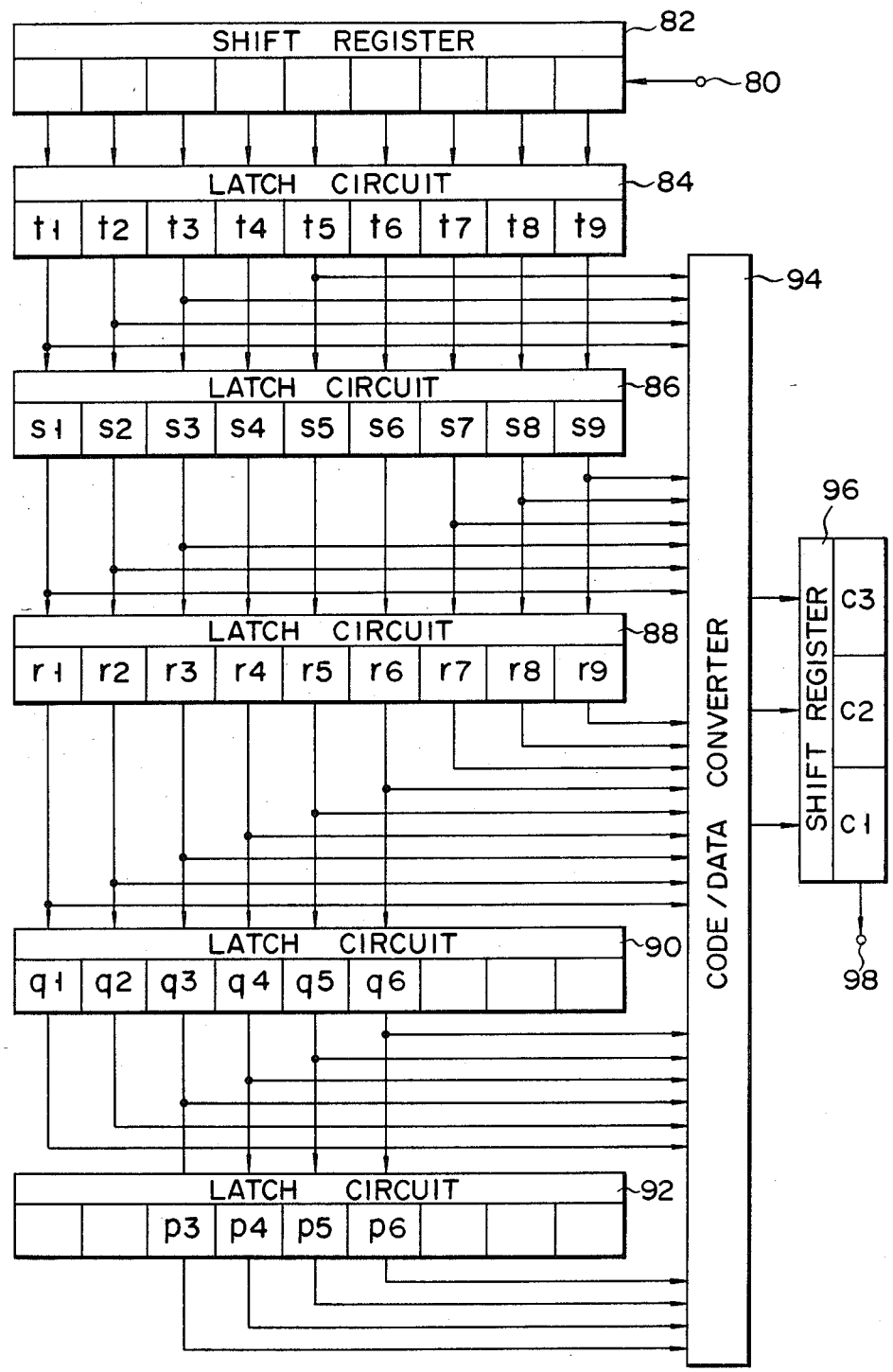
FIG. 6 is a block diagram of a decode apparatus for decoding a code word data obtained by the second encode method according to the present invention.

The decode shown in Table 9 is executed by a decode apparatus as shown in FIG. 6. The embodiment of FIG. 6 also comprises the same components as those in FIG. 4, with a difference of the code bits applied to the code/data converter 94. For the decoding, the converter 94 uses a total of 29 bits; the bits of the code word R to be decoded, the bits p3 to p6 and q1 to q6 of the code words P and Q preceding the code word R, and the bits s1 to s3, s7 to s9, t1 to t3 and t5 of the code words S and T succeeding the code word R.

Through such a decode processing, a code word stream is correctly decoded into the original data word stream.

Also in the second embodiment, the relationship between the data word and the code word may be altered.

The data/code converter 22 in FIG. 5 may be replaced by an encoder comprising logic gates. The encoder produces the following code word X (x1 to x9) base on the four data words A, B, C and D.

$$x1 = \bar{c}1\bar{c}2c3b1b2b3(\bar{a}1a2a3 + a1\bar{a}2\bar{a}3) + \bar{c}1c2\bar{c}3b1b2\bar{b}3(\bar{a}1a2a3 + a1\bar{a}2\bar{a}3) + \bar{c}1c2\bar{c}3b1b2b3(\bar{a}1a2 + a1\bar{a}2) + \bar{d}1d2\bar{d}3c1c2\bar{c}3b1\bar{b}2b3 + (\bar{d}1d3 + d1\bar{d}2\bar{d}3)c1c2c3b1\bar{b}2b3 \quad (36)$$

$$x2 = \bar{c}1\bar{c}2c3b1b2b3(\bar{a}1a2 + a1\bar{a}2) + \bar{d}1d2\bar{d}3c1c2\bar{c}3b1\bar{b}2\bar{b}3 + (\bar{d}1d3 + d1\bar{d}2\bar{d}3)c1c2c3b1\bar{b}2\bar{b}3 \quad (37)$$

$$x3 = \bar{c}1\bar{c}2c3b1b2(\bar{a}1a2 + a1\bar{a}2) + \bar{c}1c2c3b1b2b3\bar{a}1a2\bar{a}3 + \bar{c}1c2c3b1b2\bar{b}3(\bar{a}1a2 + a1\bar{a}2) + \bar{d}1d2\bar{d}3c1c2\bar{c}3\bar{b}1b2b3 + \bar{d}1d3c1c2c3\bar{b}1b2b3 \quad (38)$$

$$x4 = c1\bar{c}2c3 + d1c1c2\bar{c}3 + \bar{d}1\bar{d}2\bar{d}3c1c2\bar{c}3 + c1c2(\bar{b}1\bar{b}2 + b1b2) + (d1d2 + d1d3)c1c2c3 \quad (39)$$

$$x5 = c1\bar{c}2\bar{c}3 + \bar{d}1\bar{d}2d3c1c2\bar{c}3(\bar{b}1b2 + b1\bar{b}2) + \bar{d}1\bar{d}2d3c1c2\bar{c}3\bar{b}1b2b3 \quad (40)$$

$$x6 = \bar{c}1c2c3\overline{b1b2b3} + \bar{c}1c2c3(\bar{a}1\bar{a}2 + a1a2) + \bar{d}1d2d3c1c2\bar{c}3(\bar{b}1b2 + b1\bar{b}2) \quad (41)$$

$$x7 = \bar{c}1c2\bar{c}3 + \bar{d}1\bar{d}2\bar{d}3c1c2\bar{c}3b1\bar{b}2b3 + (\bar{d}1d3 + d1\bar{d}2\bar{d}3)c1c2c3b1\bar{b}2b3 \quad (42)$$

-continued $$x8 = \bar{c}1\bar{c}2c3\overline{b1b2b3} + \bar{c}1\bar{c}2c3\overline{a1a2a3} + (d1d2 + d1d3)c1c2c3 + c1c2c3(\bar{b}1\bar{b}2 + b1b2) \quad (43)$$

$$x9 = \bar{c}1\bar{c}2\bar{c}3 + \bar{c}1\bar{c}2c3b1b2b3\bar{a}1a2\bar{a}3 + d1c1c2\bar{c}3 + c1c2\bar{c}3(\bar{b}1\bar{b}2 + b1b2) + \bar{d}1d2d3c1c2c3(\bar{b}1b2b3 + b1\bar{b}2\bar{b}3) \quad (44)$$

The code/data converter 94 in FIG. 6 may be replaced by a decoder comprising logic gates. The decoder produces the following data word C (c1 to c3) based on 29 code bits.

$$c1' = r6(t1 + s9 + \bar{s}3) + s3(r3 + \bar{t}3\bar{t}1\bar{s}9\bar{r}6\bar{r}5\bar{r}4\bar{r}2\bar{r}1) + (s2 + r8)r2q5 + r8\bar{r}2\bar{r}1 + (s2 + r8)r1(q3p6 + q3p3 + q2p5 + q2p3) + (s2\bar{r}5\bar{r}4 + \bar{s}7s1\bar{r}4 + r9)\bar{r}3\bar{r}2\bar{r}1 + (s1 + r9)r3(q5 + q4 + \bar{q}6\bar{q}3) + \bar{s}3\bar{s}2\bar{s}1\bar{r}9r3q6 + r7(\bar{r}1 + q3 + \bar{q}4\bar{q}2\bar{q}1 + q2p5 + q2p3) \quad (45)$$

$$c2' = \bar{t}1\bar{s}9s3(r3 + \bar{t}3\bar{r}6\bar{r}5\bar{r}4\bar{r}2\bar{r}1) + s2r5(t1 + s9 + t5\bar{s}8) + s2r3 + s2r2q5 + (s2 + r8)r1(q3p6 + q3p3 + q2p5 + q2p3) + (s2\bar{r}5\bar{r}4 + \bar{s}7s1\bar{r}4 + r9)\bar{r}3\bar{r}2\bar{r}1 + s7s1(r4 + r1) + (s1 + r9)r3(q5 + q4 + \bar{q}6\bar{q}3) + r8r2q5 + (\bar{s}7s1 + \bar{s}3\bar{s}2\bar{s}1\bar{r}9r8)r2\bar{q}5\bar{q}3 + r8\bar{r}2\bar{r}1 + \bar{s}3\bar{s}2r5 + \bar{s}3\bar{s}2\bar{s}1(r4 + \bar{r}9r3q6 + \bar{r}9\bar{r}8\bar{r}7r1) \quad (46)$$

$$c3' = \bar{t}1\bar{s}9s3(r6 + r3q4 + r3\bar{q}5) + s3(r4 + r2 + r1) + s2(r5 + r3) + \bar{t}3\bar{t}1\bar{s}9s3\bar{r}6\bar{r}5\bar{r}4\bar{r}3\bar{r}2\bar{r}1 + \bar{r}9r2\bar{q}5\bar{q}3 + \bar{s}7s1r3(q4 + \bar{q}6\bar{q}5\bar{q}3) + \bar{s}7s1(r4 + \bar{r}3\bar{r}2 + r1) + s7s1r3(q6 + q3) + s7s1r2(q5 + q3) + \bar{s}7s1r2\bar{q}5\bar{q}3 + \bar{r}9r3(q4 + \bar{q}6\bar{q}5\bar{q}3) + \bar{r}9(\bar{r}1 + \bar{r}3\bar{r}2) + r7(\bar{r}1 + s7q4 + s7q2\bar{p}5\bar{p}3 + s7q1 + q3) + r7(\bar{q}4\bar{q}2\bar{q}1 + q2p5 + q2p3) + \bar{s}3\bar{s}2r5 + \bar{s}3\bar{s}2\bar{s}1\bar{r}9r3q6 + s7\bar{s}3\bar{s}2\bar{s}1\bar{r}9\bar{r}8\bar{r}7\bar{r}6\bar{r}5\bar{r}4\bar{r}3\bar{r}2\bar{r}1 \quad (47)$$

$$c1 = \overline{c1'} \quad (48)$$

$$c2 = \overline{c2'} \quad (49)$$

$$c3 = \overline{c3'} \quad (50)$$

As described above, according to the present invention, a binary code stream suitable for a high density magnetic recording is attained; Tmin=8 Tb, Tmax=6.67 Tb, and Tw=0.33 Tb.

What is claimed is:

1. A method for encoding a binary data stream into a binary code stream comprising the following steps of:
   dividing a binary data stream into data codes each of 3 bits;
   determining which groups, each data word belongs to first, second or third group;
   encoding unconditionally a data word into a binary code word of 9 bits when the data word belongs to the first group, encoding a data word into a binary code word of 9 bits in consideration of preceding or succeeding two data words when the data word belongs to the second group, encoding a data word into a binary code word of 9 bits in consideration of a preceding data word and a succeeding data word when the data word belongs to the third group;
   inverting the bit codes at predetermined bit locations in each code word and one preceding code word according to a pattern of code bits "0" and "1" in both said code word to merge said code words so that in the code word stream the code bits 37 0" from 5 to 19 are consecutively arrayed between two adjacent code bits "1"; and
   converting each of said code words into a binary code stream.

2. A method according to claim 1, in which in said encoding step, the two succeeding data words are considered for the data word in the second group, and in said inverting step two of the last five code bits in the preceding code word and one of the first two code bits in said each code word are inverted.

3. A method according to claim 1, in which in said encoding step, the two preceding data words are considered for the data word in the second group, and in said inverting step, one of the last two code bits in the preceding code word and two of the first five code bits in said each code word are inverted.

4. An apparatus for encoding a binary data stream into a binary code stream comprising:
   means for dividing a binary data stream into data codes each of 3 bits;
   means for determining which groups, each data word obtained by said dividing means belongs to first, second or third group;
   means for encoding unconditionally a data word into a binary code word of 9 bits when the data word belongs to the first group, encoding a data word into a binary code word of 9 bits in consideration of preceding or succeeding two data words when the data word belongs to the second group, encoding a data word into a binary code word of 9 bits in consideration of a preceding data word and a succeeding data word when the data word belongs to the third group;
   means for inverting the bit codes at predetermined bit locations in each code word and one preceding code word according to a pattern of code bits "0" and "1" in both said code word to merge said code words so that in the code word stream the code bits "0" from 5 to 19 are consecutively arrayed between two adjacent code bits "1"; and
   means for converting each of said code words obtained by said inverting means into a binary code stream.

5. An apparatus according to claim 4, in which said encoding means comprising:
   first storing means connected to an output terminal of said dividing means in a cascade fashion, and for storing a first data word to be encoded, second and third data words preceding and succeeding said first data word, and a fourth data word succeeding said third data word;
   encode means for generating a code word of 9 bits on the basis of said four data words stored in said first storing means; and
   seconds storing means for storing one code word preceding to the code word output from said encoded means, and in which said inverting means inverts codes at predetermined bit locations in the output code word from said encode means and in the code word stored in said second storing means according to a pattern of code bits "0" and "1" in both said code words to merge said code words to that the code bits "0" from 5 to 19 are consecutively arrayed between two adjacent code bits "1".

6. An apparatus according to claim 5, in which said encode means generates code bits x1 to x9 as given by the following equations:

$x1 = \bar{b}1\bar{b}2\bar{b}3 + \bar{b}1\bar{b}2b3c1c2c3\bar{d}1d2\bar{d}3 + a1b1\bar{b}2\bar{b}3 +$ $\quad b1\bar{b}2\bar{b}3(\bar{c}1\bar{c}2 + c1\bar{c}2) + \bar{a}1a2a3b1b2\bar{b}3(\bar{c}1c2c3 + c1\bar{c}2\bar{c}3)$ $x2 = \overline{\bar{b}1\bar{b}2b3c1\bar{c}2c3} + \overline{\bar{b}1\bar{b}2b3\bar{d}1d2\bar{d}3} + (a1a2 + a1a3)b1b2b3 +$ $\quad b1\bar{b}2b3(\bar{c}1\bar{c}2 + c1\bar{c}2)$ $x3 = \bar{b}1b2\bar{b}3 + \bar{a}1a2\bar{a}3b1b2\bar{b}3c1\bar{c}2c3 + (\bar{a}1a3 +$ $\quad a1\bar{a}2\bar{a}3)b1b2b3c1\bar{c}2c3$ $x4 = \overline{\bar{b}1\bar{b}2b3c1\bar{c}2c3} + \bar{b}1b2b3(\bar{d}1d2 + d1d2) +$ $\quad \bar{a}1a2a3b1b2\bar{b}3(\bar{c}1c2 + c1\bar{c}2)$ $x5 = b1\bar{b}2\bar{b}3 + \bar{a}1a2a3b1b2\bar{b}3(\bar{c}1c2 + c1\bar{c}2) + \bar{a}1a2a3b1b2b3\bar{c}1c2\bar{c}3$ $x6 = b1\bar{b}2\bar{b}3 + a1b1\bar{b}2\bar{b}3 + \bar{a}1a2\bar{a}3b1b2\bar{b}3 + b1b2(\bar{c}1\bar{c}2 + c1\bar{c}2) +$ $\quad (a1a2 + a1a3)b1b2b3$ $x7 = \bar{b}1\bar{b}2\bar{b}3c1c2(\bar{d}1d2 + d1\bar{d}2) + \bar{b}1\bar{b}2b3c1c2c3\bar{d}1d2\bar{d}3 +$ $\quad \bar{b}1b2b3c1c2\bar{c}3(\bar{d}1d2 + d1\bar{d}2) + \bar{a}1a2\bar{a}3b1b2\bar{b}3\bar{c}1c2c3 +$ $\quad \bar{a}1a3b1b2b3\bar{c}1c2c3$ $x8 = \bar{b}1\bar{b}2b3c1c2c3(\bar{d}1d2 + d1\bar{d}2) + \bar{a}1a2\bar{a}3b1b2\bar{b}3c1\bar{c}2\bar{c}3 +$ $\quad (\bar{a}1a3 + a1\bar{a}2\bar{a}3)b1b2b3c1\bar{c}2\bar{c}3$ $x9 = \bar{b}1\bar{b}2b3c1c2c3(\bar{d}1d2d3 + d1\bar{d}2\bar{d}3) + \bar{b}1\bar{b}2b3c1c2\bar{c}3(\bar{d}1d2d3 +$ $\quad d1\bar{d}2\bar{d}3) + \bar{b}1b2b3c1c2c3(\bar{d}1d2 + d1\bar{d}2) + \bar{a}1a2\bar{a}3b1b2\bar{b}3c1\bar{c}2c3 +$ $\quad (\bar{a}1a3 + a1\bar{a}2\bar{a}3)b1b2b3c1\bar{c}2c3$ where a1 to a3 are data bits of the second data word,
 b1 to b3 are data bits of the first data word,
 c1 to c3 are data bits of the third data word, and
 d1 to d3 are data bits of the fourth data word.

7. An apparatus according to claim 6, in which said inverting means inverts two of the last five code bits in the code word stored in said second storing means and one of the first two code bits in the code word generated from said encode means.

8. An apparatus according to claim 4, in which said encoding means comprising:
 first storing means connected to an output terminal of said dividing means in a cascade fashion, and for storing a first data word to be encoded, second and third data words preceding and succeeding said first data word, and a fourth data word preceding said second data word;

encode means for generating a code word of 9 bits on the basis of said four data words stored in said first storing means; and seconds storing means for storing one code word preceding to the code word output from said encoded means, and in which said inverting means inverts codes at predetermined bit locations in the output code word from said encode means and in the code word stored in said second storing means according to a pattern of code bits "0" and "1" in both said code words to merge said code words so that the code bits "0" from 5 to 19 are consecutively arrayed between two adjacent code bits "1".

9. An apparatus according to claim 8, in which said encode means generates code bits x1 to x9 as given by the following equations:

$x1 = \bar{c}1\bar{c}2c3b1b2\bar{b}3(\bar{a}1a2a3 + a1\bar{a}2\bar{a}3) + \bar{c}1c2\bar{c}3b1b2\bar{b}3(\bar{a}1a2a3 +$ $\quad a1\bar{a}2\bar{a}3) + \bar{c}1c2\bar{c}3b1b2b3(\bar{a}1a2 + a1\bar{a}2) + \bar{d}1d2\bar{d}3c1\bar{c}2\bar{c}3b1\bar{b}2\bar{b}3 +$ $\quad (\bar{d}1d3 + d1\bar{d}2\bar{d}3)c1c2c3b1\bar{b}2\bar{b}3$ $x2 = \bar{c}1\bar{c}2c3b1b2\bar{b}3(\bar{a}1a2 + a1\bar{a}2) + \bar{d}1d2\bar{d}3c1\bar{c}2\bar{c}3b1\bar{b}2\bar{b}3 + (\bar{d}1d3 +$ $\quad d1\bar{d}2\bar{d}3)c1c2c3b1\bar{b}2\bar{b}3$ $x3 = \bar{c}1\bar{c}2\bar{c}3b1b2(\bar{a}1a2 + a1\bar{a}2) + \bar{c}1c2\bar{c}3b1b2b3\bar{a}1a2\bar{a}3 +$ $\quad \bar{c}1c2c3b1b2\bar{b}3(\bar{a}1a2 + a1\bar{a}2) + \bar{d}1d2\bar{d}3c1c2\bar{c}3\bar{b}1b2b3 +$ $\quad \bar{d}1d3c1c2\bar{c}3\bar{b}1b2b3$ $x4 = c1\bar{c}2c3 + d1c1c2\bar{c}3 + \bar{d}1d2\bar{d}3c1c2\bar{c}3 + c1c2(\bar{b}1\bar{b}2 + b1\bar{b}2) +$ $\quad (d1d2 + d1d3)c1c2c3$ $x5 = c1\bar{c}2\bar{c}3 + \bar{d}1\bar{d}2 d3c1c2\bar{c}3(\bar{b}1b2 + b1\bar{b}2) + \bar{d}1d2d3c1c2c3\bar{b}1b2\bar{b}3$ $x6 = \bar{c}1c2\bar{c}3\bar{b}1\bar{b}2\bar{b}3 + \bar{c}1c2c3(\bar{a}1\bar{a}2 + a1a2) +$ $\quad \bar{d}1d2d3c1c2\bar{c}3(\bar{b}1b2 + b1\bar{b}2)$ $x7 = \bar{c}1c2\bar{c}3 + \bar{d}1d2\bar{d}3c1c2\bar{c}3b1\bar{b}2b3 + (\bar{d}1d3 +$ $\quad d1\bar{d}2\bar{d}3)c1c2c3b1\bar{b}2b3$ $x8 = \bar{c}1\bar{c}2c3\overline{b1\bar{b}2b3} + \bar{c}1\bar{c}2c3\overline{a1a2\bar{a}3} + (d1d2 + d1d3)c1c2c3 +$ $\quad c1c2c3(\bar{b}1\bar{b}2 + b1\bar{b}2)$ $x9 = \bar{c}1\bar{c}2\bar{c}3 + \bar{c}1\bar{c}2c3b1b2b3\bar{a}1a2\bar{a}3 + d1c1c2\bar{c}3 + c1c2\bar{c}3(\bar{b}1\bar{b}2 +$ $\quad b1\bar{b}2) + \bar{d}1d2d3c1c2c3(\bar{b}1b2b3 + b1\bar{b}2\bar{b}3)$ where a1 to a3 are data bits of the fourth data word,
 b1 to b3 are data bits of the second data word,
 c1 to c3 are data bits of the first data word, and
 d1 to d3 are data bits of the third data word.

10. An apparatus according to claim 8, in which said inverting means inverts one of the last two code bits in the code word stored in said second storing means and two of the first five code bits in the code word generated from said encode means.

* * * * *